(12) United States Patent
Koo et al.

(10) Patent No.: US 9,161,343 B2
(45) Date of Patent: *Oct. 13, 2015

(54) METHOD AND APPARATUS FOR AVOIDING IN-DEVICE COEXISTENCE INTERFERENCE

(75) Inventors: Changhoi Koo, Plano, TX (US); Jun Li, Richardson, TX (US); Zhijun Cai, Herdon, VA (US)

(73) Assignee: BlackBerry Limited, Waterloo, Ontario (CA)

(*) Notice: Subject to any disclaimer, the term of this patent is extended or adjusted under 35 U.S.C. 154(b) by 243 days.

This patent is subject to a terminal disclaimer.

(21) Appl. No.: 13/877,250

(22) PCT Filed: Oct. 1, 2010

(86) PCT No.: PCT/US2010/051183
§ 371 (c)(1),
(2), (4) Date: May 10, 2013

(87) PCT Pub. No.: WO2012/044327
PCT Pub. Date: Apr. 5, 2012

(65) Prior Publication Data
US 2013/0223391 A1      Aug. 29, 2013

(51) Int. Cl.
*H04W 4/00* (2009.01)
*H04W 72/04* (2009.01)
*H04W 72/12* (2009.01)

(52) U.S. Cl.
CPC ...... *H04W 72/0406* (2013.01); *H04W 72/1215* (2013.01)

(58) Field of Classification Search
CPC .............................................. H04W 72/0406
USPC ....................................................... 370/329
See application file for complete search history.

(56) References Cited

U.S. PATENT DOCUMENTS 7,366,128 B2   4/2008  Hundal et al.
7,643,811 B2   1/2010  Reunamaki et al.
(Continued)

FOREIGN PATENT DOCUMENTS

EP   2169840        3/2010
JP   2013-545328   12/2013
(Continued)

OTHER PUBLICATIONS

Research in Motion UK Limited; "Enhancement of FDM Solution and HO"; 3GPP TSG-RAN WG2#70 (R2-111234); Feb. 21, 2011.
(Continued)

*Primary Examiner* — Shripal Khajuria
*Assistant Examiner* — Faisal Choudhury
(74) *Attorney, Agent, or Firm* — Fish & Richardson P.C.

(57) ABSTRACT

A method, system and device are provided for avoiding in-device coexistence interference between different radio technologies deployed in adjacent bands on the same device by controlling and separating the LTE signaling and the non-LTE signaling using dedicated time intervals to separate LTE signaling from non-LTE signaling. In addition, coexistence mode handover procedures are provided which use threshold-based triggering events to avoid coexistence interference and to prevent ping-pong effects by establishing a "keeping time" parameter so that a non-interfering network node does not switch back to an interfering network node after handoff. Coexistence interference is also avoided by providing a hybrid automatic repeat request (HARQ) mechanism which accounts for coexistence interference by providing a fixed or variable on-interval parameter and an activity parameter indicating whether non-LTE activity is present to maximize a time interval for non-LTE devices without interference from LTE activity on the same device.

43 Claims, 11 Drawing Sheets

(56) References Cited

U.S. PATENT DOCUMENTS

| | | | |
|---|---|---|---|
| 7,907,572 B2 | 3/2011 | Yang et al. | |
| 8,200,161 B2 | 6/2012 | Walley et al. | |
| 8,331,289 B1 | 12/2012 | Lee et al. | |
| 8,340,580 B1 | 12/2012 | Epstein | |
| 8,547,867 B2 | 10/2013 | Koo et al. | |
| 8,553,622 B2 | 10/2013 | Yang | |
| 8,805,303 B2 | 8/2014 | Koo et al. | |
| 8,831,611 B2 | 9/2014 | Koo et al. | |
| 2008/0107054 A1 | 5/2008 | Parts et al. | |
| 2008/0125128 A1 | 5/2008 | Yoo et al. | |
| 2008/0205365 A1 | 8/2008 | Russell et al. | |
| 2009/0104909 A1 | 4/2009 | Vesely et al. | |
| 2009/0180451 A1 | 7/2009 | Alpert et al. | |
| 2011/0044195 A1* | 2/2011 | Wiemann et al. | 370/252 |
| 2011/0243047 A1 | 10/2011 | Dayal et al. | |
| 2011/0243094 A1 | 10/2011 | Dayal et al. | |
| 2011/0268024 A1 | 11/2011 | Jamp et al. | |
| 2011/0312288 A1* | 12/2011 | Fu et al. | 455/88 |
| 2012/0069766 A1* | 3/2012 | Fu et al. | 370/252 |
| 2012/0077506 A1* | 3/2012 | Wietfeldt et al. | 455/450 |
| 2012/0082077 A1 | 4/2012 | Zhang et al. | |
| 2012/0082140 A1 | 4/2012 | Lin et al. | |
| 2012/0087341 A1 | 4/2012 | Jang et al. | |
| 2012/0113906 A1* | 5/2012 | Kadous et al. | 370/329 |
| 2012/0164948 A1 | 6/2012 | Narasimha et al. | |
| 2012/0170557 A1 | 7/2012 | Tsfati et al. | |
| 2012/0176923 A1 | 7/2012 | Hsu et al. | |
| 2012/0182896 A1 | 7/2012 | Jang et al. | |
| 2012/0195291 A1 | 8/2012 | Kuo et al. | |
| 2012/0207032 A1 | 8/2012 | Chen et al. | |
| 2012/0207040 A1 | 8/2012 | Comsa et al. | |
| 2012/0208040 A1 | 8/2012 | Lien et al. | |
| 2012/0314598 A1 | 12/2012 | Sadek et al. | |
| 2013/0242919 A1* | 9/2013 | Koo et al. | 370/329 |
| 2014/0031036 A1 | 1/2014 | Koo et al. | |
| 2014/0287771 A1 | 9/2014 | Koo et al. | |

FOREIGN PATENT DOCUMENTS

| | | |
|---|---|---|
| KR | 10-2004-0060459 | 7/2004 |
| KR | 10-2009-0061244 | 6/2009 |
| KR | 10-2010-0028453 | 3/2010 |
| KR | 10-2013-0096745 | 8/2013 |
| WO | 2008/142529 | 11/2008 |
| WO | 2009/137295 | 11/2009 |
| WO | WO 2009/137295 | 11/2009 |
| WO | WO 2009/141490 | 11/2009 |
| WO | WO 2010/002219 | 1/2010 |
| WO | 2010/027208 | 3/2010 |

OTHER PUBLICATIONS

Notice of Allowance issued in Japanese Application No. 2013-531557 on Apr. 23, 2013; 3 pages.
Office Action issued in Korean Application No. 10-2013-7011218 on Apr. 22, 2014; 5 pages—no translation.
3GPP TR 36.318 V1.0.0 (Nov. 2010); "3rd Generation Partnership Project; Technical Specification Group Radio Access Networks; Evolved Universal Terrestrial Radio Access (E-UTRA); Study on Signalling and Procedure for Interference Avoidance for In-Device Coexistence (Release 10)"; Dec. 17, 2010; 34 pages.
Baghel, Sudhir Kumar et al; "Coexistence Possibilities of LTE with ISM Technologies and GNSS"; IEEE 2011 National Conference on Communications; Jan. 28, 2011; 5 pages.
CATT; "FDM-Based Approach for In-Device Coexistence Interference"; 3GPP TSG RAN WG2 Meeting #71bis (R2-105336); Xi'an, China; Oct. 11-15, 2010; 2 pages.
Huawei, HiSilicon, CMCC; "Open Issues on FDM"; 3GPP TSG-RAN WG2 Meeting #72bis (R2-110383); Dublin, Ireland; Jan. 17-21, 2011; 4 pages.
LG Electronics Inc.; "Possible Solutions for In-Device Interference Avoidance"; 3GPP RAN WG2 (R2-104880); Madrid, Spain; Aug. 17, 2010.
MediaTek; "Trigger of UE Reporting for FDM Solution"; 3GPP TSG-RAN WG2 Meeting #72bis (R2-110258); Dublin, Ireland; Jan. 17-21, 2010; 4 pages.
Qualcomm Incorporated; "In-Device Coexistence Interference between LTE and ISM Bands"; 3GPP TSG-RAN WG4 Ad-hoc Meeting #10-03 (R4-102416); Bratislava, SK; Jun. 28-Jul. 2, 2010; 6 pages.
Qualcomm Incorporated; "Problem Scenarios and Propsed Solutions for In-Device Coexistence"; 3GPP RAN WG2 (R2-104910); Madrid, Spain; Aug. 17, 2010.
ZTE; "Considerations of the Detail Procedure for FDM Approach"; 3GPP TSG-RAN WG2 Meeting #72bis (R2-110243); Dublin, Ireland; Jan. 17-21, 2011; 6 pages.
International Search Report and Written Opinion of the International Searching Authority issued in International Application No. PCT/US2010/051193 on Jul. 1, 2011; 15 pages.
International Search Report and Written Opinion of the International Searching Authority issued in International Application No. PCT/US2010/051197 on Jun. 29, 2011; 12 pages.
International Search Report and Written Opinion of the International Searching Authority issued in International Application No. PCT/US2012/025594 on May 21, 2012; 13 pages.
International Search Report and Written Opinion of the International Searching Authority issued in International Application No. PCT/US2012/025598 on Jun. 6, 2012; 9 pages.
Office Action issued in Mexican Application No. MX/a/2013/003359 on Nov. 8, 2013; 2 pages—no translation.
Office Action issued in U.S. Appl. No. 13/069,828 on May 13, 2014.
Notice of Allowance issued in Japanese Application No. 2013-531556 on May 2, 2014; 3 pages. No translation.
Notice of Allowance issued in Japanese Application No. 2013-531558 on May 2, 2014; 3 pages. No translation.
Office Action issued in Korean Application No. 10-2013-7011215 on Apr. 28, 2014; 7 pages. No translation.
Office Action issued in Korean Application No. 10-2013-7011219 on Apr. 28, 2014; 6 pages—no translation.
Office Action issued in Mexican Application No. MX/a/2013/003358 on Aug. 16, 2013; 2 pages—no translation.
Intel Corporation (UK) Ltd.; "Discussion of In-Device Coexistence Scenarios and Solutions"; 3GPP TSG-RAN WG2 #71 (R2-104382); Madrid, Spain; Aug. 23-27, 2010; 3 pages.
International Search Report and Written Opinion of the International Searching Authority issued in International Application No. PCT/US2010/051183 on Jun. 29, 2011; 11 pages.
Office Action issued in U.S. Appl. No. 13/877,206 on Aug. 25, 2014.
Notice of Allowance issued in U.S. Appl. No. 13/069,828 on Jul. 3, 2014; 9 pages.
Notice of Allowance issued in U.S. Appl. No. 13/069,912 on May 29, 2014.
Communication Pursuant to Article 94(3) EPC issued in corresponding European Application No. 12709417.5 on Jul. 1, 2014; 7 pages.
Notice of Allowance issued in Mexican Application No. MX/a/2013/003359 on Jul. 18, 2014; 1 page. No translation.
Office Action issued in Mexican Application MX/a/2013/003423 on Jul. 3, 2014; 3 pages. No translation.
Office Action issued in U.S. Appl. No. 13/069,912 on Jun. 19, 2013; 14 pages.
Notice of Allowance issued in U.S. Appl. No. 13/069,751 on Jun. 4, 2013; 9 pages.
Office Action issued in Mexican Application No. MX/a/2013/003359 on Aug. 8, 2013; 4 pages—no translation.
3GPP TR 36.816 V1.0.0 (Nov. 2010); "Chapter 4—Scenarios"; Dec. 2010; 6 pages.
Office Action and Search Report issued in Taiwanese Application No. 101105334 on Sep. 11, 2014; 19 pages.
Office Action and Search Report issued in Taiwanese Application No. 101105335 on Sep. 3, 2014; 8 pages.
Office Action issued in Korean Application No. 10-2013-7024686 on Sep. 22, 2014; 3 pages. No translation.
Notice of Allowance issued in Korean Application No. 10-2013-7011215 on Oct. 20, 2014; 3 pages.
Notice of Allowance issued in Korean Application No. 10-2013-7011218 on Oct. 20, 2014; 3 pages.

(56) References Cited

OTHER PUBLICATIONS

Office Action and Search Report issued in Taiwanese Application No. 101105389 on Oct. 1, 2014; 7 pages.

Office Action issued in Canadian Application No. 2,813,290 on Oct. 6, 2014; 2 pages.

Office Action issued in Japanese Application No. 2013-531556 on Feb. 4, 2014; 5 pages—no translation.

Office Action issued in Japanese application No. 2013-531557 on Feb. 10, 2014; 2 pages—no translation.

Office Action issued in Japanese Application No. 2013-531558 on Feb. 4, 2014; 5 pages—no translation.

Office Action issued in U.S. Appl. No. 13/069,912 on Jan. 23, 2014; 14 pages.

Notice of Allowance issued in Mexican Application No. MX/a/2013/03358 on Nov. 29, 2013; 1 page—no translation.

MediaTek; "Analysis in In-Device Coexistence Interference Avoidance"; H 3GPP TSG RAN WG2 #71 (R2-104444); Madrid, Spain; Aug. 23-27, 2010; 10 pages.

Office Action issued in Korean Application No. 10-2013-7024791 on Dec. 19, 2014; 5 pages. No translation.

MediaTek; "Email Discussion on Information from UE for FDM Solution"I 3GPP TSG-RAN WG2 Meeting #72 (R2-106291); Jacksonvill, Florida; Oct. 15-19, 2010; 7 pages.

Notice of Allowance issued in Korean Application No. 10-2013-7011219 on Oct. 23, 2014; 3 pages.

Office Action issued in Korean Application No. 10-2013-7024794 on Nov. 13, 2014; 7 pages. No translation.

Mexican Notice of Allowance in Mexican Application No. MX/a/2013/003423, dated Jan. 14, 2015, 1 page.

Taiwanese Notice of Allowance in Taiwanese Application No. 101105335, dated Dec. 24, 2014, 3 pages.

Canadian Office Action in Canadian Application No. 2,826,401, dated Jan. 26, 2015, 4 pages.

Canadian Office Action in Canadian Application No. 2,813,292, dated Feb. 16, 2015, 5 pages.

Canadian Office Action in Canadian Application No. 2,826,399, dated Feb. 20, 2015, 4 pages.

Canadian Office Action in Canadian Application No. 2,826,395, dated Mar. 12, 2015, 3 pages.

* cited by examiner

METHOD AND APPARATUS FOR AVOIDING IN-DEVICE COEXISTENCE INTERFERENCE

CLAIM OF PRIORITY

This application is a U.S. National Stage of PCT/US2010/051183 filed on Oct. 1, 2010.

BACKGROUND OF THE INVENTION

1. Field of the Invention

The present invention is directed in general to communications systems and methods for operating same. In one aspect, the present invention relates to the methods, systems and devices for managing coexistence interference between different radio technologies deployed in adjacent bands.

2. Description of the Related Art

The growing market of smart connected devices requires that the same device supports multiple radio technologies on the in-device platform. However, some configurations may cause severe performance degradation due to the in-device interference. For example, with devices that support both Long Term Evolution (LTE) and Industrial, Science and Medical (ISM) technologies (such as Bluetooth and/or WLAN), there are important use cases for concurrent operation of these radios. The coexistence issues arise between ISM technologies and LTE deployed in adjacent bands. As shown in Table 1 below, coexistence interference arises where ISM transmission creates interference to the LTE receiver, and also arises where LTE transmission creates interference to the ISM receiver.

TABLE 1

Interference of the LTE and ISM components on the in-device configuration

| LTE TDD (2.3-2.4 GHz, Band 40) LTE UL (2.5-2.6 GHz, Band 7) | ISM (2.4-2.4835 GHz) | Coexistence |
|---|---|---|
| Rx | Tx | LTE: Interfered ISM: Normal |
| Tx | Rx | LTE: Normal ISM: Interfered |

Similar coexistence issues occur with devices that include both LTE and Global Positioning System (GPS) components. As shown in Table 2 below, when LTE and GPS components are working on the same device, there will be interference due to adjacent operation or harmonics frequency which cannot be avoided by the allocation of a guard band at the sub-harmonic frequency.

TABLE 2

Interference of the LTE and GPS component configuration on in-device

| LTE (777-787 MHz/746-756 MHz, Band 13) (788-798 MHz/758-768 MHz, Band 14) | GPS (1575.42 MHz) | Coexistence |
|---|---|---|
| Tx | Rx | LTE: Normal GPS: Interfered |

As will be appreciated, there are challenges to using current state-of-the-art filter technology to address coexistence interference since terminal filters do not provide sufficient rejection on the adjacent channel interference. These challenges are particularly acute in the case of these components configured in a single device where the interference occurs when the LTE component is transmitting on the specified bands. Accordingly, a need exists for improved method, system and device for managing coexistence interference between different radio technologies to overcome the problems in the art, such as outlined above. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

Figure 1:
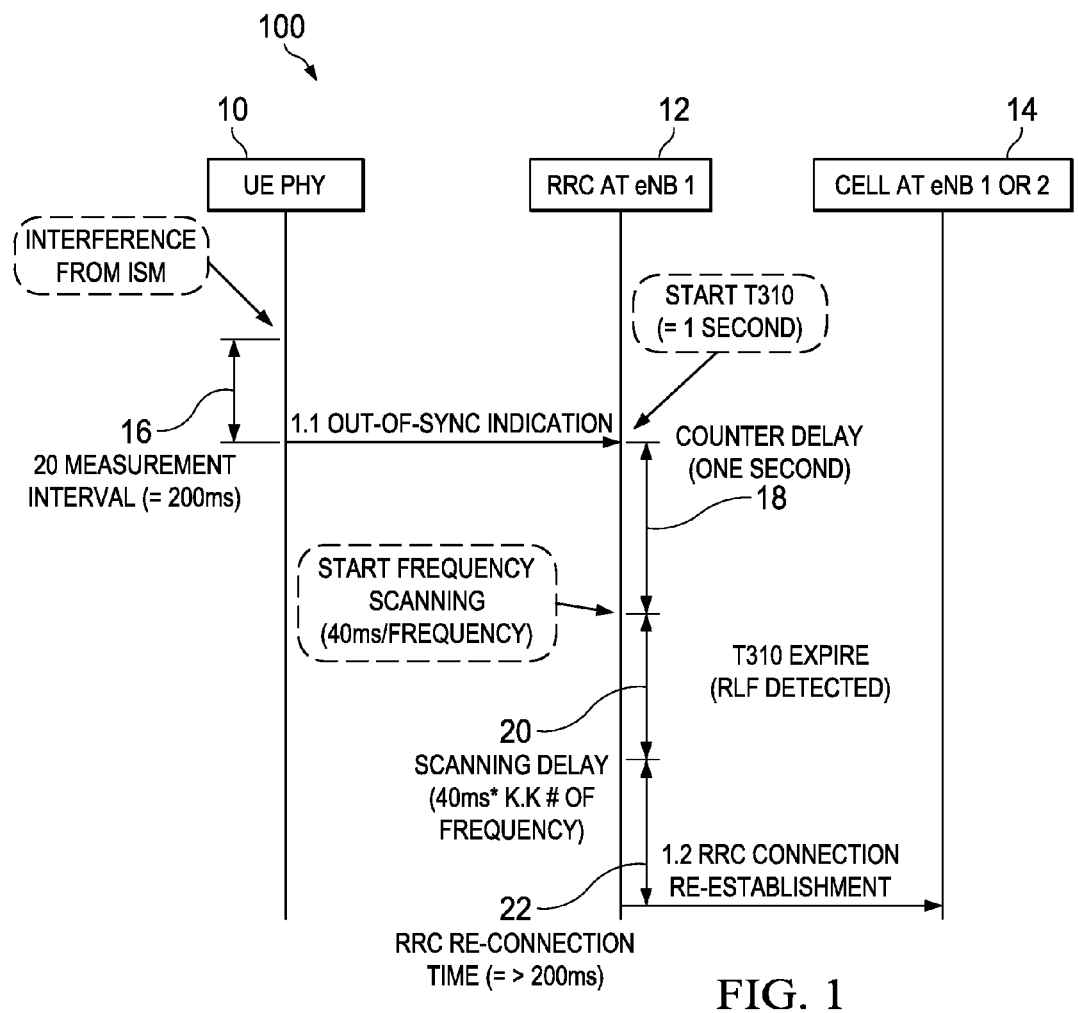
FIG. 1 is a signal flow diagram illustrating how existing radio resource management signaling procedures may be used to address coexistence interference.

A method, system and device are provided for avoiding in-device coexistence interference between different radio technologies deployed in adjacent bands on the same device. In selected embodiments, radio resource management mechanisms (RRM) and signaling procedures are disclosed to provide a coexistence operation mode by controlling and separating the LTE signaling and the non-LTE signaling, thereby establishing a time division multiplexing-based solution in which there is no coexistence interference. To enable the signaling scheme, radio resource control signal messages (e.g., CoExist-REQ, CoExist-RSP, CoExist-REJ, CoExist-Deact-REQ and CoExistDeact-RSP) and/or information elements (Action, Start Time Offset, Keeping Time, On-interval, Off-interval, Coexistence Cycle, Maximum Ratio, Possible Link, and/or Extension) are provided for use by the user equipment (UE) and enhanced node B (eNB) to establish signaling operations to enable operation in a time division multiplex (TDM) coexistence mode to avoid in-device interferences. In addition, coexistence mode handover procedures are provided which use threshold-based triggering events to avoid coexistence interference and to prevent ping-pong effects by establishing a "keeping time" parameter so that a non-interfering network node does not switch back to an interfering network node after handoff. Coexistence interference is also avoided by providing a hybrid automatic repeat request (HARQ) mechanism which accounts for coexistence interference by providing a fixed or variable on-interval parameter and an activity parameter indicating whether non-LTE activity is present to maximize a time interval for non-LTE devices without interference from LTE activity on the same device.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram and flow chart form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Ongoing 3GPP discussions have addressed the technical challenges associated with addressing interference caused by concurrent operation of multiple radio technologies. The difficulties here may be understood with reference to the example of a single device which supports LTE technology with ISM (e.g., Bluetooth and/or WLAN) and/or GPS technologies which can interfere with one another, such as when the ISM transmitter interferes with the LTE receiver, or when the LTE transmitter causes interference with the ISM and GPS receiver operations. For example and as reported at the 3GPP report R4-102268 entitled "LS on in-device coexistence interference," the Bluetooth (BT) component error rate is unacceptable when an LTE component is active in some channels of Band 7 or even Band 40 for some BT component channel conditions. Thus, even though there is no degradation to the LTE component, simultaneous operation with the BT component can result in unacceptable disruption in voice services terminating in a BT headset. A similar issue exists when LTE transmissions interfere with GPS components. Currently, there is no RRM mechanism for addressing this issue since LTE by itself does not experience any degradation. There are also interference scenarios for the LTE components caused by the non-LTE components. For example and as reported in the 3GPP report R4-102268, the LTE downlink (DL) error rate can be very high (44-55% on PDSCH) when the BT component is active and LTE is deployed in Band 40.

To further illustrate the potential interference from concurrent operation of different radio technologies, Table 3 (below) lists the LTE and WLAN related RF parameters taken from test data and 3GPP specifications TS36.101 and TS36.104, where the specifications of spurious emission and allowed interference power for WLAN are based on test data obtained from the 3GPP report R4-100706 entitled "Coexistence studies between LTE and WLAN."

TABLE 3

RF parameters of the LTE and ISM configuration

| | LTE BS | LTE UE | WLAN AP | WLAN SS |
|---|---|---|---|---|
| Pout | 46 dBm (TS36.104) | 23 dBm (TS36.101) | | |
| Spurious Emissions | −30 dBm/MHz (TS36.104) | −30 dBm/MHz (TS36.101) | −30 dBm/MHz (No specified) | −40 dBm/MHz |
| Allowed interference power | −116 dBm/MHz (@5 dB Rx noise figure) | −105 dBm/MHz (@9 dB Rx noise figure) | −116 dBm/MHz (No specified) | −105 dBm/MHz (No specified) |
| OOB Blocking power requirement | −30 MHz (TS36.104) | −44 MHz (TS36.101) | Power Class Freq. Offset | Pout = 27 dBm<br>30 MHz 80 MHz<br>−40 dBm −25 dBm | Pout = 20 dBm<br>30 MHz 80 MHz<br>−35 dBm −25 dBm |

Based on current the state-of-the-art filter technology, it is difficult for a terminal filter to provide sufficient rejection on the adjacent frequencies. This is illustrated with reference to Table 4 (below) which shows the minimum coupling loss (MCL) requirements for LTE UE and WLAN station service (SS) configurations based on the parameters shown in Table 3.

TABLE 4

MCL requirements for LTE UE and WLAN SS configurations.

| Interference Case | Spurious Emission | Blocking |
|---|---|---|
| LTE UE to WLAN SS | 75 dB | 63 dB |
| WLAN SS to LTE UE | 65 dB | 71 dB |

As shown above, there is interference between geographically co-located LTE UE and WLAN SS, even if they are not in the same device. As a result, the coexistence interference problem cannot be solved with a single generic RF design for the in-device case. Attempts to provide dynamically switchable filtering operations to address in-device co-interference add significant cost and complexity to the device design and manufacture.

There have been attempts to address the coexistence interference problems using existing radio resource management (RRM) mechanisms and signaling procedures, such as RSRQ measurement, inter-frequency/inter-RAT handover, cell (re) selection, RLF monitoring and connection (re)establishment. However, these procedures require further evaluation to determine if they could handle the coexistence interference and guarantee the required quality of service (QoS). For example, a normal LTE handover procedure using RRC message exchange is not guaranteed to succeed when there is LTE DL interference since high DL error rates can lead to a DL Radio Link Failure (RLF), which in turn can cause unacceptable problems when the UE attempts to re-establish the connection by accessing another frequency.

One such problem with using existing RRM mechanism is the QoS degradation caused by delay in recovering from RLF which is supposed to be used only in extreme scenarios and is not designed for maintaining QoS guarantee of an on-going connection. In particular and as illustrated with reference to the signal flow diagram 100 shown FIG. 1, the time to declare RLF can be quite large, depending on the network settings of the RLF timer T310 and N310 counter. Once the UE 10 has declared DL RLF upon detecting interference from another device radio component (e.g., ISM), the UE performs an initial search during a first measurement interval 16 before sending the Out-of-Synch Indication (signal flow 1.1), shown in this example as requiring 200 ms. Then, the UE must access a different channel which leads to additional delay at the source eNB 12 associated with the counter delay 18 from the RLF timer T310 (e.g., 1000 ms), frequency scanning delay 20 (e.g., 40 ms×k, where k is the number of frequencies), and RRC reconnection time 22 (e.g., at least 200 ms) until such time as RRC connection is established via signal flow 1.2 to cell 14 at the same or different eNB. In this example, RLF recovery can take at least 1.56 sec (=200 ms+1000 ms+40 ms*k+200 ms, when k=4) to determine and recover from radio link failure.

Another problem with using existing RRM mechanisms is the ping-pong effect that arises when there is a second handover from the re-established connection at a new frequency channel back to the original frequency channel that was corrupted by the in-device interference. For example, the ping-pong scenario can occur when the desired signal strength on the corrupted channel is higher than the new frequency channel. If handover decisions are based on RSRP-based measurement reports from the UE 10, the ping-pong effect transfers the UE 10 back and forth between the corrupted channel and the desired channel, especially when the coverage is different on different carrier frequencies causing the corrupted channel to be the strongest one. While the ping-pong effect can be avoided if the source eNB 12 uses RSRQ measurements instead of (or in addition to) RSRP to make handover decisions, this would require the eNB 12 to configure all UEs in the cell to use RSRQ measurements since the eNB 12 cannot identify which UEs may be using their ISM radio, leading to additional and undesirable configuration/reporting overhead.

To address the coexistence interference problems and limitations from existing solutions, there is disclosed herein signaling procedures which provide a resource sharing or re-allocation scheme in which potentially conflicting signaling operations are separated from one another.

In selected embodiments, the disclosed signaling procedures provide a coexistence operation mode by defining new RRC signaling messages which are exchanged between the network and the mobile device for establishing a time division multiplex (TDM) mode of operation to enable coexistence operation between LTE and non-LTE components (e.g., ISM and GPS). Alternatively, new information elements are defined which may be inserted in existing RRC messages to provide TDM-based solutions to enable coexistence operation between LTE and non-LTE components. Thus, the present invention is not limited or restricted to any particular application or messaging scheme since the functionality of the proposed messages (e.g., CoExist-REQ and CoExist-RES) could be adopted as information elements (IE) in other new or existing RRC messages (e.g., RRCConnectionReconfiguration or RRCConnectionReconfigurationComplete or UECapabilityInformation messages). For example, one or more bits can be added to the UECapabilityInformation message to add a new information element indicating that the UE is a multi-component UE which may have the in-device coexistence issues. Of course, the specific names used here are for illustration only, and other names may be used to achieve the described function or outcome from the processing of the message.

With a first configuration message (or information element), a Coexistence Request Message (e.g., CoExist-REQ) is provided which the UE sends to the eNB before initiating operation of a non-LTE component on the UE device. With this message/IE, the UE device requests that operations be configured with the eNB to support cooperative signaling between the LTE and non-LTE components. As described below, the Coexistence Request Message may include proposed parameters for the coexistence operation mode, such as Start Time Offset, Keeping Time, On-Interval, Off-Interval, and Possible Link, and Action.

A Coexistence Response Message (e.g., CoExist-RSP) is also provided as a configuration message/IE which is sent by the eNB in response to CoExist-REQ to allow the coexistence operation mode. With the Coexistence Response Message, the eNB may set parameters of coexistence mode based on the UE's request and/or on the eNB's operational requirements, such as scheduling, HARQ, etc.

A Coexistence Reject Message may also be provided as a configuration message/IE which is sent by the eNB to reject the Coexistence Request Message from the UE. In selected embodiments, the Coexistence Reject Message is a separate message (e.g., CoExist-REJ), but in other embodiments, the Coexistence Response Message is instead used by configuring or adding a predetermined parameter or field (e.g., by setting a Keeping Time parameter to "zero"). In still further embodiments, the rejection message can be conveyed by having the network eNBs broadcast an indication to all UEs in the cell to disable the coexistence operation mode.

A Coexistence Deactivation Request Message may also be provided as a configuration message/IE which is sent by the UE to deactivate or modify the coexistence operation mode. In selected embodiments, the Coexistence Deactivation Request Message is a separate message (e.g., CoExistDeact-REQ), but in other embodiments, the Coexistence Request Message is instead used by configuring or adding a predetermined field or bit(s) (e.g., an Action field) to indicate the purpose of message.

A Coexistence Deactivation Response Message may also be provided as a configuration message/IE which is sent by the eNB to respond to the Coexistence Deactivation Request Message, though in other embodiments the Coexistence Deactivation Response Message is sent by the eNB without solicitation. In selected embodiments, the Coexistence Deactivation Response Message is a separate message (e.g., CoExistDeact-RSP), but in other embodiments, the Coexistence Response Message is instead used by configuring or adding a predetermined field or bit(s) (e.g., an Action field) to indicate the purpose of message.

A UE Capability message may also be provided as a configuration message/IE which is sent by the UE to indicate UE's multi-component capability to eNB.

In accordance with selected embodiments, there is shown in Table 5 (below) additional details of the proposed messages and/or information elements with specific parameters which can be determined for the proposed operation and standard specification.

tive of whether the Keeping Time parameter was signaled. Such network control may be implemented via MAC CE or RRC messaging, though MAC CE requires less delay and signaling overhead. In other embodiments, the UE may send a Turn Off request to the network (e.g., via MAC CE) to indicate the intention to turn off the non-LTE component(s), and the network sends back a Turn Off indicator to the UE (e.g., via MAC CE).

The On-interval field/parameter specifies an LTE signaling time duration for when the LTE component is able to use (transmit and receive) all of radio resources on the DL and UL without enabling the non-LTE component. During the On-interval, any non-LTE component will be disabled. In similar fashion, the Off-interval field/parameter specifies the non-LTE signaling time duration for when the non-LTE compo-

TABLE 5

Proposed messages and information elements

| Information Elements | CoExist-REQ | CoExistDeact-REQ | CoExist-RSP | CoExistDeact-RSP | Remarks |
|---|---|---|---|---|---|
| Action | Set | Reset or N/A | Set | Reset or N/A | Message action. If 4 messages are used, CoExistDeact-REQ and RSP messages do not include this field. |
| Start Time Offset | Immediately or SFN/subframe/ slot or time | Immediately or SFN/subframe/ slot or time | Immediately or SFN/subframe/ slot or time | Immediately or SFN/subframe/slot or time | Beginning time of Coexistence mode operation |
| Keeping Time | SFN/subframe/ slot or time | N/A | SFN/subframe/ slot or time | N/A | Ending time of Coexistence mode operation |
| On-interval | SFN/subframe/ slot or time | N/A | SFN/subframe/ slot or time | N/A | Time duration for Activating of LTE component |
| Off-interval | SFN/subframe/ slot or time | N/A | SFN/subframe/ slot or time | N/A | Time duration for Activating of non-LTE component |
| Possible Link | Nothing, DL, UL or both | N/A | Nothing, DL, UL or both | N/A | Possible LTE component link during Off-interval |

Under each message (CoExist-REQ, CoExistDeact-, CoExist-RSP, CoExistDeact-RSP) listed in Table 5, there is shown an information element parameter (Action, Start Time Offset, Keeping Time, On-Interval, Off-Interval, and Possible Link) which provides the function or operation described in the "remarks" column.

The Start Time Offset field or parameter indicates the actual action time for when coexistence mode operation begins as either an absolute or relative value, and can be specified by system frame number (SFN), subframe, slot or actual time. SFN is a useful and an easy reference point to indicate the starting of coexistence mode operation. An absolute start time value specifies the absolute time (e.g., SFN, subframes, slots, etc.), while a relative start time specifies the Start Time Offset relative to a point in time (e.g., when the response message is received by the UE) with a time offset value (e.g., in subframes, slots or an absolute time duration, say 100 milliseconds).

The Keeping Time field/parameter specifies the time duration for maintaining the UE device in coexistence mode. At the end of the Keeping Time interval, the UE device turns off the non-LTE component(s) and goes back to the normal LTE mode. Instead of being signaled by the UE, the Keeping Time parameter can be controlled by network implementation, such as by having directly send a "Turn Off" indicator to request the UE to turn off the non-LTE components, irrespecnent is able to transmit and receive without the LTE component being enabled or receiving no interference.

The Possible Link field/parameter specifies an LTE component activity (none, uplink, downlink, or both) that may continue operating during the Off-interval (when LTE components are normally deactivated). This field may be used with a UE device that includes both LTE and GPS components where the GPS component will always be in reception status. In this case, the GPS components receive downlink LTE signals at the UE device, even during the Off-interval so the LTE component could utilize the resources for reception without causing interference between each component. For example, by setting the Possible Link field to Down Link (DL), the LTE component may continue to receive System Information, Paging, and the MBSFN subframes which only occur in the DL reception during Off-interval. In this way, the link specified with the Possible Link parameter will be activated regardless of On/Off interval duration. While two bits are sufficient to specify four possible link activities (e.g., "00=Nothing", "01=DL", "10=UL" and "11=both"), it will be appreciated that more or fewer link activities can be specified with additional or fewer bits.

In accordance with selected embodiments, it will be appreciated that the specific number and names of the messages can vary. For example, the four listed messages (CoExist-REQ, CoExistDeact-, CoExist-RSP, CoExistDeact-RSP) can be implemented with fewer messages, such as by setting an Action field of a message (e.g., CoExist-REQ message) to a first value (e.g., "1") to signify a Coexistence Request Message, and to a second value (e.g., "0") to signify a Coexistence Deactivation Request Message. Likewise, the Action field in the CoExist-RSP message can be used to represent both CoExist-RSP and CoExistDeact-RSP messages. Of course, the messaging functionality can alternatively be consolidated into the CoExistDeact-REQ and CoExistDeact-RSP message without requiring solicitation by a previous message, such as by setting an Action field setting in the CoExist-RSP (and CoExistDeact-RSP) message to "0" to indicate that the message sent in unsolicited manner without receiving of CoExist-REQ message. The Action field setting may also be used to add or remove any of the other information elements.

With the described messaging, a UE device requests a coexistence operation mode by proposing parameter values in the initial Coexistence Request Message, and the eNB responds with a set of operational parameters that specify a coexistence configuration. If the LTE component at the UE device cannot perform the specified coexistence configuration or wants to request a different configuration from that specified in the CoExist-RSP message from eNB, it can send another CoExist-REQ message with new requested parameters to re-negotiate the coexistence operation mode. If the LTE component does not send another CoExist-REQ message in response to the CoExist-RSP message, the LTE component implicitly accepts the configuration parameters indicated by CoExist-RSP message.

Figure 2:
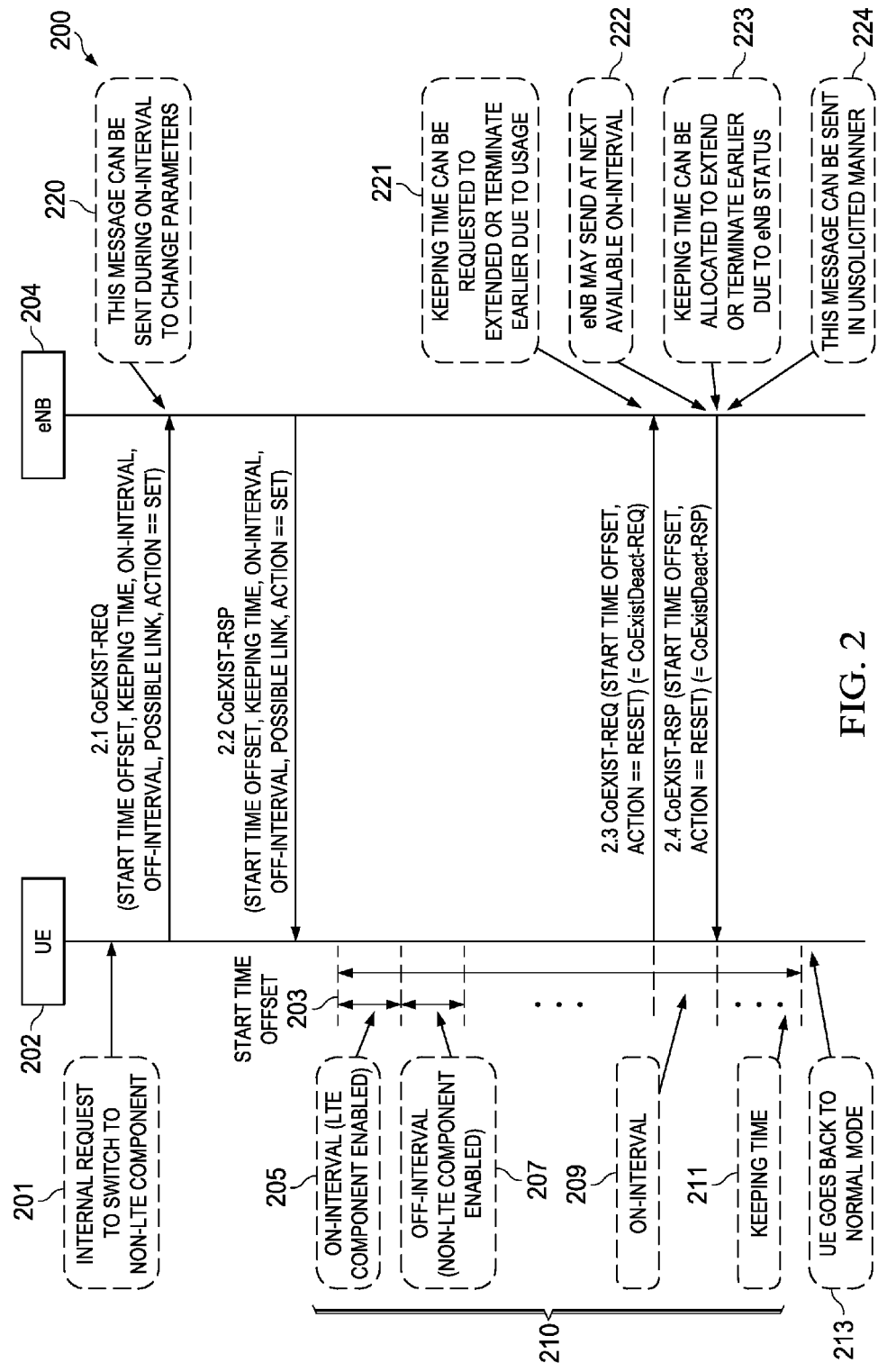
FIG. 2 is a signal flow diagram illustrating a radio resource control signaling call flow in accordance with selected embodiments of the present invention.

Turning now to FIG. 2, there is depicted a radio resource control signaling call flow 200 in accordance with selected embodiments of the present invention wherein LTE and non-LTE components installed on a single UE device platform exchange coexistence signaling messages to separate the LTE and non-LTE signaling in time, thereby avoiding coexistence interference. On this shared platform, the LTE component on the UE 202 can know the instance when the non-LTE component is enabled, and can request coexistence mode operation by sending a request message to the eNB 204 at signal flow 2.1. The eNB 204 responds with a response message (signal flow 2.2) to the UE 202 that includes signal control parameters defining a coexistence mode of operation with a start time, end time, and alternating intervals of operation for the LTE and non-LTE components.

In an example embodiment shown in FIG. 2, the UE 202 detects when an internal request to switch to non-LTE component is initiated (201). In response, the UE 202 (or LTE component thereon) sends a request message (CoExist-REQ message 2.1) to the eNB 204 with proposed coexistence parameters, such as Start Time Offset, Keeping Time, On-interval, Off-interval, Possible Link, and an Action field set to "1." If the LTE component at the UE 202 is coexisting with ISM components, the Possible Link parameter can be set to "Nothing" in order to ensure no coexistence interference issues. On the other hand, if the LTE component at the UE 202 is coexisting with a GPS component, the Possible Link parameter can be set to "DL" so that the LTE component can receive messages in the DL while the GPS component receiver is enabled. As will be appreciated, the LTE component at the UE 202 sends the request message to the eNB 204, so the LTE component must either be "on" or at least activated in an "On-interval" during coexistence mode (220).

On reception, the eNB 204 sends a response message (CoExist-RSP message 2.2) back to the UE 202 in response to the request message CoExist-REQ. This response message accepts or modifies the proposed coexistence parameters from the UE's request message by returning a set of (counter-proposed) coexistence parameters, such as Start Time Offset, Keeping Time, On-interval, Off-interval, Possible Link, and Action field set to "1." The response message 2.2 may configure the coexistence parameters as absolute or delta configuration values. With an absolute value configuration, the eNB 204 sends all related coexistence parameters in the response message 2.2, but with a delta value configuration, the eNB 204 only sends the coexistence parameters in the response message 2.2 that are different from the request message 2.1.

Based on the coexistence parameters in the response message received by the UE 202, the LTE component enters into a coexistence operation mode, beginning at the Start Time Offset 203 and continuing until expiration at the Keeping Time 211, with alternating On-intervals 205, 209 (during which the LTE component is enabled) and Off-intervals 207 (during which the non-LTE component is enabled).

During the coexistence mode 210, the LTE component may optionally send an update message 2.3 to the eNB 204 to request that the duration of the coexistence operation mode 210 be extended or terminated. In selected embodiments, the update message 2.3 is a separate message (e.g., CoExistDeact-REQ message) received at the eNB (221) which seeks to deactivate or extend the coexistence operation mode, such as by terminating or extending the Keeping Time. In other embodiments, the update message uses the first request message (CoExist-REQ message) which has the Action field set to "0." In either case, the update message 2.3 may include update parameters, such as Start Time Offset and an Action field reset to "0," where the updated Start Time Offset value specifies the new end point or Keeping Time value for the coexistence operation mode 210.

The eNB 204 responds to the update message 2.3 by sending an update response 2.4 during an available On-interval 209 (222). In selected embodiments, the update response 2.4 is a separate message (e.g., CoExistDeact-RSP message), while in other embodiments, the update message uses the first response message (CoExist-RSP message) which has the Action field reset to "0." With the update response message 2.4, the coexistence operation mode is deactivated or extended depending on the eNB status (223), such as by terminating or extending the Keeping Time. And while the update response 2.4 is shown as being sent in response to the update message 2.3, the update response 2.4 may be sent in unsolicited manner without receiving an update message (224). For example, the update message 2.4 can be sent without solicitation (224) if the eNB 204 determines that the coexistence operation mode requires extension or early termination. Once the Keeping Time 211 expires, the LTE component in the UE 202 and the eNB 204 return to normal mode 213 where the LTE component is enabled and the non-LTE component is disabled and turned-off.

Figure 3:
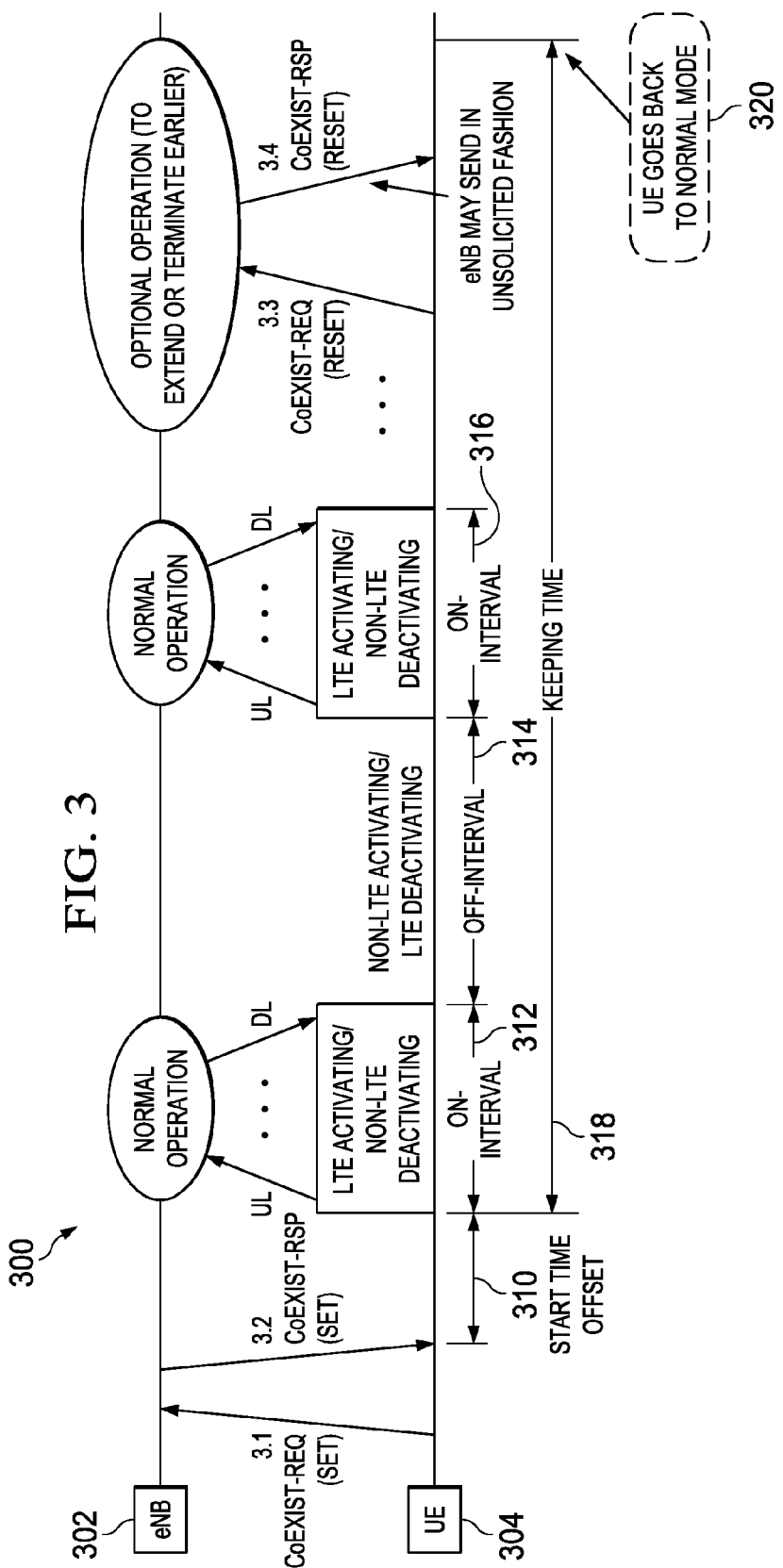
FIG. 3 illustrates a signal timing flow for LTE and ISM devices where the "Possible Link" setting is set to a first value indicating that no LTE device signal reception is expected during an Off-Interval.

Turning now to FIG. 3, there is illustrated a signal timing flow 300 for establishing a coexistence operation mode between eNB device 302 and UE device 304 having LTE and ISM components. The expected coexistence operation mode is set up by exchanging request and response messages in which the "Possible Link" setting in the coexistence parameters is set to a first value indicating that no LTE device signal reception is expected during the Off-interval. First, the UE 304 sends a first request message 3.1 (e.g., CoExist-REQ message) to the eNB 302 with proposed coexistence parameters, such as start time (e.g., Start Time Offset 310), end time (e.g., Keeping Time 318), On-interval 312, Off-interval 314, and Action field (e.g., set to "1"). In addition, the Possible Link field may be set to "Nothing" (e.g., "00") for LTE and ISM components to signify that no LTE signal reception is expected when the ISM component(s) are activated. In the response message 3.2 (e.g., CoExist-RSP message), the proposed parameters are accepted, repeated or modified so that the UE 304 and eNB 302 are configured to establish a coexistence operation mode having defined On-interval(s) 312, 316 during which the LTE component is in normal operation mode. In normal operation, the activated LTE component in the UE 304 sends uplink data to the eNB 304 and receives downlink data from the eNB 302, and the non-LTE component(s) are disabled and turned off. The established coexistence operation mode also has a defined Off-interval 314 during which the LTE component is disabled and the non-LTE component(s) are enabled to transmit and receive signals. The depicted On-intervals and Off-intervals may each have a fixed time duration and periodicity so that the alternating intervals repeat until expiration of the Keeping Time 318 provided that an update response message is not received from the eNB 302. However, update messaging may be generated to terminate or extend the Keeping Time. For example, the UE 304 may send an update message 3.3 (e.g., a CoExistDeact-REQ message or a reset CoExist-REQ message) to request extension or early termination of the Keeping Time. Alternatively, the eNB can sent an (unsolicited) update response message 3.4 (e.g., a CoExistDeact-RSP message or reset CoExist-RSP messages) to extend or terminate the Keeping Time. Upon expiration of the Keeping Time 318, the UE 304 returns to normal LTE mode 320 with the non-LTE components deactivated.

Figure 4:
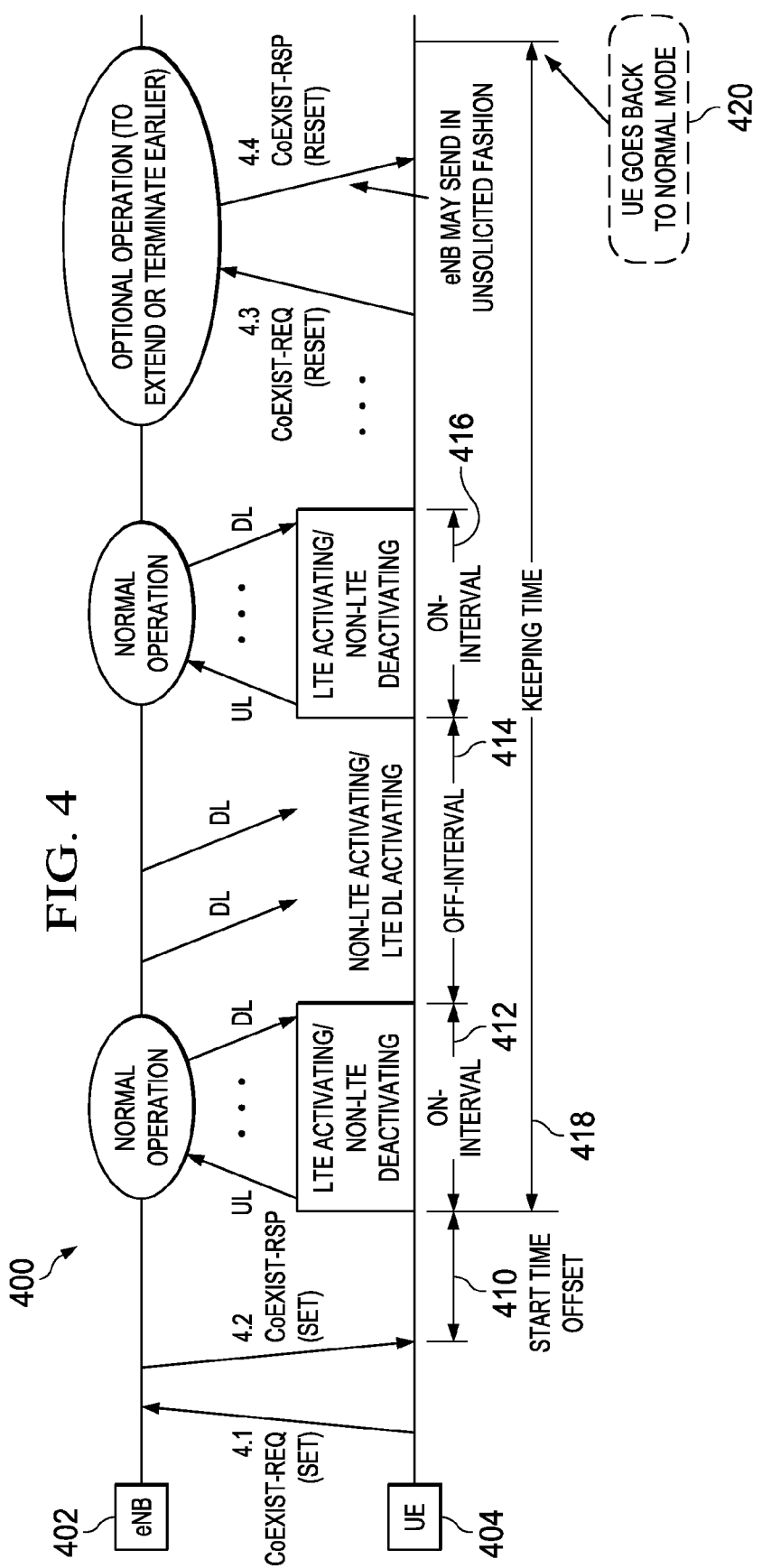
FIG. 4 illustrates a signal timing flow for LTE and ISM devices where the "Possible Link" setting is set to a second value indicating that downlink LTE device signal reception is expected during an Off-Interval.

Turning now to FIG. 4, there is illustrated a signal timing flow 400 for establishing a coexistence operation mode between eNB device 402 and UE device 404 having LTE and GPS components where LTE downlink device signal reception is expected during the Off-interval. The expected coexistence operation mode is set up by exchanging request and response messages in which the "Possible Link" setting in the coexistence parameters is set to a second value indicating LTE downlink signal reception is expected during the Off-interval. To set up the expected coexistence operation mode, the UE 404 sends a first request message 4.1 (e.g., CoExist-REQ message) to the eNB 402 with proposed coexistence parameters, such as start time (e.g., Start Time Offset 410), end time (e.g., Keeping Time 418), On-interval 412, Off-interval 414, and Action field (e.g., set to "1"). In addition, the Possible Link field may be set to "DL" (e.g., "01") for LTE and GPS components to signify that LTE downlink signaling is expected when the LTE components are de-activated. In the response message 4.2 (e.g., CoExist-RSP message), the proposed parameters are accepted, repeated or modified so that the UE 404 and eNB 402 are configured to establish a coexistence operation mode having defined On-interval(s) 412, 416 during which the LTE component is in normal operation mode for sending and receiving uplink and downlink data while the non-LTE component(s) are disabled and turned off. The established coexistence operation mode also has a defined Off-interval 414 during which the non-LTE component(s) and LTE downlink signaling are enabled, but where the LTE component is otherwise disabled. In this configuration, even though the LTE component is in Off-interval 414, it can receive the DL traffics and signals from the eNB 402. The depicted On-intervals 412 and Off-intervals 414 are alternated until expiration of the Keeping Time 418, unless update messaging 4.3 and/or 4.4 is generated to terminate or extend the Keeping Time 418. Upon expiration of the Keeping Time 418, the UE 404 returns to normal LTE mode 420 with the non-LTE components deactivated.

With the disclosed arrangement for establishing a coexistence operation mode, the LTE and non-LTE signaling is separated into different signaling intervals, thereby avoiding coexistence interference without incurring QoS degradation or time delay associated the DL RLF mechanisms.

In addition to or in place of the scheme for separating the LTE and non-LTE signaling in time, coexistence interference can be avoided by performing an LTE handover from a first eNB/cell/frequency to a second eNB/cell/frequency in the event of coexistence interference at the first eNB/cell/frequency. For example, an LTE component that is experiencing interference from a non-LTE component can use existing RRM procedures to request a handover to neighboring cell or frequency. However, this can lead to a "ping-pong" handover problem when the LTE component attempts to return to the previous eNB/cell/frequency when the co-interference at the first eNB/cell/frequency is reduced due to the non-LTE component being turned off, such as when the previous eNB/cell or frequency has a stronger signal. Depending on the non-LTE component behavior, the ping-pong handovers can occur frequently, thereby consuming bandwidth with undesirable signaling overhead. To reduce or eliminate ping-pong handover operation, an improved handover operation is disclosed which uses predetermined triggering events and associated procedures to prevent handover back to the source eNB/cell/frequency during a specified time interval.

Figure 5:
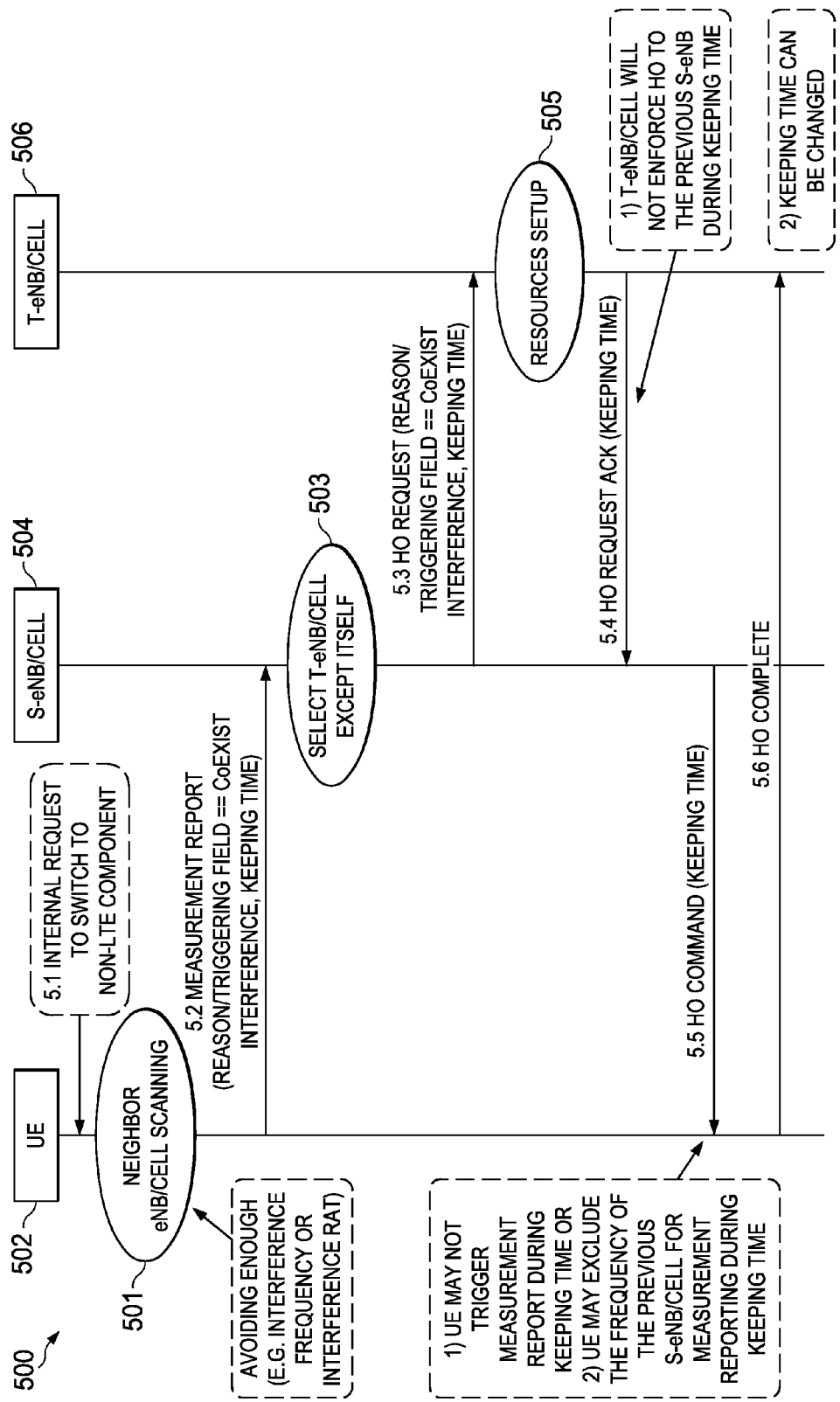
FIG. 5 is a signal flow diagram for a UE-requested handover signaling call flow in accordance with selected embodiments of the present invention.

To illustrate the improved handover procedure, reference is made to FIG. 5 which shows a signal flow diagram 500 for a UE-requested coexistence handover operation in accordance with selected embodiments of the present invention. Generally speaking, the UE 502 requests that the source eNB/cell 504 perform a handover to a target eNB/cell 506, where the handover may be implemented in inter-frequency or inter-RAT environments. The requested handover specifies a time interval or Keeping Time during which time the target eNB/cell 506 is prevented from performing a handover back to the source eNB/cell 504. With the disclosed coexistence handover operation, the LTE component at the UE 502 does not need to indicate to the eNB 504 when any non-LTE components are enabled at the UE 502, but just starts a handover procedure to avoid undesirable interference from/to non-LTE components at the UE 502. After completion of handover, the LTE and non-LTE components at the UE 502 can work simultaneously without any interference between them.

In particular, the signal flow begins when the UE 502 detects that a handover is required. The detection can be based on any desired triggering event, such as receiving an internal message signal 5.1 requesting that the UE 502 enable or switch to a non-LTE component. In response, the UE 502 scans the neighboring eNB/cells or frequencies (501) to evaluate their signal strength and identify any neighboring eNBs or cells that will not interfere with the non-LTE signaling at the UE 502. Based on the scan results, the UE 502 generates and sends to the serving eNB/cel 504 a measurement report (message signal 5.2) which identifies the triggering event for the handover. At this point, the LTE component can select the target eNB/cell or frequencies 506 to avoid coexistence interference fully (e.g., inter-frequency or inter-RAT). In the case of handover being triggered by in-device coexistence interference, the "Reason/Triggering" field in the measurement report 5.2 identifies the cause as "CoExist Interference," depending on how the coexistence interference was detected.

To support efficient and prompt handover, one or more predetermined triggering events are proposed for use in the "Reason/Triggering" field of the measurement report 5.2. In particular, Table 6 below lists the handover triggering events listed in 3GPP TS 36.331 ("Evolved Universal Terrestrial Radio Access (E-UTRA); Radio Resource Control (RRC); Protocol specification"), along with new triggers A6-A8 and B3.

TABLE 6

Triggering events for handover cases

| Event | Existing and New Triggering Reasons | HO Usage |
|---|---|---|
| A1 | Serving cell becomes better than absolute threshold | LTE |
| A2 | Serving cell becomes worse than absolute threshold | LTE |
| A3 | Neighbor cell becomes better than an offset relative to the serving cell | LTE |
| A4 | Neighbor cell becomes better than absolute threshold | LTE |
| A5 | Serving cell becomes worse than one absolute threshold and neighbor cell becomes better than another absolute threshold | LTE |
| A6 | Serving cell becomes worse than one absolute threshold and neighbor cell becomes better than another absolute threshold due to in-device coexistence interference | LTE |
| A7 | Neighbor cell becomes better than an offset relative to the serving cell due to in-device coexistence interference | LTE |
| A8 | Serving cell becomes worse than absolute threshold due to in-device coexistence interference | LTE |
| B1 | Neighbor cell becomes better than absolute threshold | Inter-RAT |
| B2 | Serving cell becomes worse than one absolute threshold and neighbor cell becomes better than another absolute threshold | Inter-RAT |
| B3 | Serving cell becomes worse than absolute threshold and neighbor cell becomes better than another absolute threshold due to in-device coexistence interference | Inter-RAT |

As shown in Table 6, triggering events of A6-A8 are proposed for LTE handovers, and triggering event B3 is proposed for Inter-RAT handovers. Trigger event A6 is used by the UE 502 to request an LTE handover when a signal strength measure (e.g., Reference Signal Received Quality (RSRQ) or Reference Signal Received Power (RSRP)) for the serving eNB/cell 502 is below a first absolute threshold and a signal strength measure (e.g., RSRQ or RSRP) for the target eNB/cell 506 is above a second absolute threshold. Trigger event A7 is used by the UE 502 to request an LTE handover when a signal strength measure for a neighboring/target eNB/cell 506 is better than an offset relative to a signal strength measure of for the serving eNB/cell 502 due to in-device coexistence interference at the UE 502. Trigger event A8 is used by the UE 502 to request an LTE handover when a signal strength measure for a serving eNB/cell 502 becomes worse than an absolute threshold due to in-device coexistence interference at the UE 502. Finally, trigger event B3 is used by the UE 502 to request an Inter-RAT handover when a signal strength measure for the serving eNB/cell 502 becomes worse than an absolute threshold due to in-device coexistence interference at the UE 502.

In order for the UE 502 to send the inter-frequency/inter-RAT measurement report 5.2 based on the proposed triggers A6-A8 and B3, the serving eNB/cell 504 configures the UE 502 with a measurement identity that corresponds to an inter-frequency/inter-RAT measurement object. At RRC connection establishment or at any time while in connected mode, the UE 502 sends an RRC message to the serving eNB/cell 504 to indicate that the UE 502 has both LTE components and coexisting non-LTE component(s) (e.g. ISM and/or GPS). The message may also include an indication from the UE 502 of the preferred target carrier frequencies to handover to (or the carrier frequencies to avoid) when coexistence interference arises. In this way, the serving eNB/cell 504 can configure one or more measurement identities that correspond to carrier frequencies where coexistence interference is expected to be low or tolerable. In selected embodiments, the serving eNB/cell 504 only needs to configure the inter-frequency/inter-RAT measurement identities for the UE 502 if the carrier frequency of the serving eNB/cell 504 is potentially interfering because it is located close to the non-LTE component band or belongs to one of the carrier frequencies to avoid as indicated by the UE 502. The measurement quantity configured for the inter-freq/inter-RAT measurement identities should be set to RSRQ in order to capture the interference caused by non-LTE component band.

In other embodiments, a triggering handover mechanism may be applied to the RSRQ measurement of the serving eNB/cell 504 to account for the bursty interference caused by transmission in the non-LTE band. The triggering handover mechanism may operate as follows. If the RSRQ signal strength measure is below a specified threshold, X, for a specified duration, Y, a counter, N, at the UE 502 is incremented by one. When the value of counter N exceeds a specified threshold, the UE 502 sends a measurement report to the eNB 504 which includes inter-frequency/inter-RAT measurement results that correspond to the frequencies/RATs of the configured measurement identity.

In addition to specifying a handover triggering event, the measurement report 5.2 from the LTE component also proposes a time interval (e.g., Keeping Time) to the eNB/cell 504. The specified Keeping Time value will be used after handover to maintain the new connection with the target eNB/cell 506 for the specified time interval. Alternatively, the Keeping Time/time interval can also controlled by network implementation rather than by signaling from the UE 502, such as by having the network eNBs broadcast the Keeping Time information to all eNB/cells.

Upon receiving the measurement report message 5.2, the serving eNB/cell 504 sends a handover request message 5.3 (HO-REQUEST) to the target eNB/cell 506 which identifies the reason (e.g., in the Reason/Triggering field) and Keeping Time as received from the UE 502. If the UE 502 did not already select the target eNB/cell 506, the source eNB/cell 504 may identify the target eNB/cell 506 in a list of target cells that does not include the source eNB/cell 504 (503).

At the target eNB/cell 506, the resources for the UE 502 are set up (505), and then the target eNB/cell 506 send back a handover acknowledgement message 5.4 (HO-REQUEST-ACK) with Keeping Time to the serving eNB/cell 504 in response to the handover request message 5.3. In selected embodiments, the target eNB/cell 506 may change the Keeping Time value from that proposed by the UE 502, based on status and/or environmental considerations at the target eNB/cell 506. Based on the received Keeping Time and any identified triggering events related to coexistence interference, the target eNB/cell 506 may be configured to keep the new connection with the LTE component for at least the duration of the Keeping Time. In addition or in the alternative, the target eNB/cell 506 instructs the UE 502 that is can not handover the frequency back to the serving serving eNB/cell 504 for the duration of the Keeping Time to avoid undesirable ping-pong handover between the previous serving eNB/cell 504 and new target eNB/cell 506.

Upon receiving the handover acknowledgement message 5.4, the serving eNB/cell 504 sends a handover command message 5.5 (HO-COMMAND) to instruct the UE 502 to perform handover to the target eNB/cell 506. The handover command message 5.5 may include the Keeping Time value specified by the target eNB/cell 506 for use by the UE 502 in preventing ping-pong handovers. For example, the handover command message 5.5 may include an instruction to prevent the UE 502 from generating a measurement report during the Keeping Time interval, thereby preventing initiation of another handover procedure. Alternatively, the handover command message 5.5 may instruct the UE 502 to exclude the frequency of the serving eNB/cell 504 from any measurement reporting conducted during the Keeping Time interval, thereby preventing initiation of another handover procedure to the serving eNB/cell 504.

On successful acquisition of the target eNB/cell 506, the UE 502 sends the handover complete message 5.6 (HO-COMPLETE) to signify completion of the handover procedure. After completion of handover, target eNB/cell 506 is configured to prevent handover of the UE back to the frequency of the previous serving eNB/cell 504 during the Keeping Time interval. However, the target eNB/cell 506 may initiate handover to another target eNB/cell (not shown) which is not on the frequency of the serving eNB/cell 504.

With the disclosed coexistence handover operation, the serving eNB/cell 504 informs the target eNB/cell 506 that the UE 502 should not be handed back to the serving eNB/cell 504 during the specified Keeping Time duration. This restriction prevents handover back to the original frequency of the previous serving eNB/cell 504, even in situations where the signal strength of the serving eNB/cell 504 (or any cell on the same frequency) is higher than that of the target eNB/cell 506, even if the non-LTE component at the UE 502 is not enabled. If the target eNB/cell 506 is not notified that the handover of the UE 502 is due to coexistence interference, the target eNB/cell 506 may try to handover the UE 502 back to the original frequency of the previous serving eNB/cell 504 or frequency when the non-LTE component is disabled. This could trigger another handover immediately away from the original cell 504 upon reactivation of the non-LTE component. Likewise, a number of consecutive On-interval/Off-interval repetitions during the Keeping Time could induce the undesirable ping-pong operation if there is no restriction on the LTE component measuring the source eNB/cell or frequency.

In selected embodiments, it will be appreciated that the triggering events A6-A8 and B3 are not used when there is coexistence interference detected at the UE 502. In these embodiments, when the UE 502 scans the neighboring eNB/cells and generates the associated measurement reporting, the measurement report is configured to include an indicator (to indicate to the network the measurement report is caused by the coexistence scenario) and a Keeping Time value (to prevent ping-pong handovers during the Keeping Time interval).

In connection with the disclosed signaling scheme for separating the LTE and non-LTE signaling in time, there is also disclosed herein a hybrid automatic repeat request (Hybrid ARQ or HARQ) scheme which implements a fixed On-interval in a coexistence operation mode of a UE device to help avoid coexistence interference. In this arrangement, HARQ procedures (including forward error-correcting coding and error detection using the ARQ error-control techniques) are configured to operate only during fixed on-intervals in the coexistence operation mode, depending on the activity status of the non-LTE components, thereby enabling the non-LTE components to operate during the Off-intervals without interference from the in-device LTE components or the HARQ-related signaling. In other words, the fixed On-interval established for coexistence operation mode will not be adjusted according to the HARQ operations, and any HARQ procedures running in RRC-CONNECTED state with DL/UL data transmission will be limited to transmission during the fixed On-interval for LTE components so that any enabled non-LTE components on the same device can transmit/receive during the Off-interval without coexistence interference.

Figure 6:
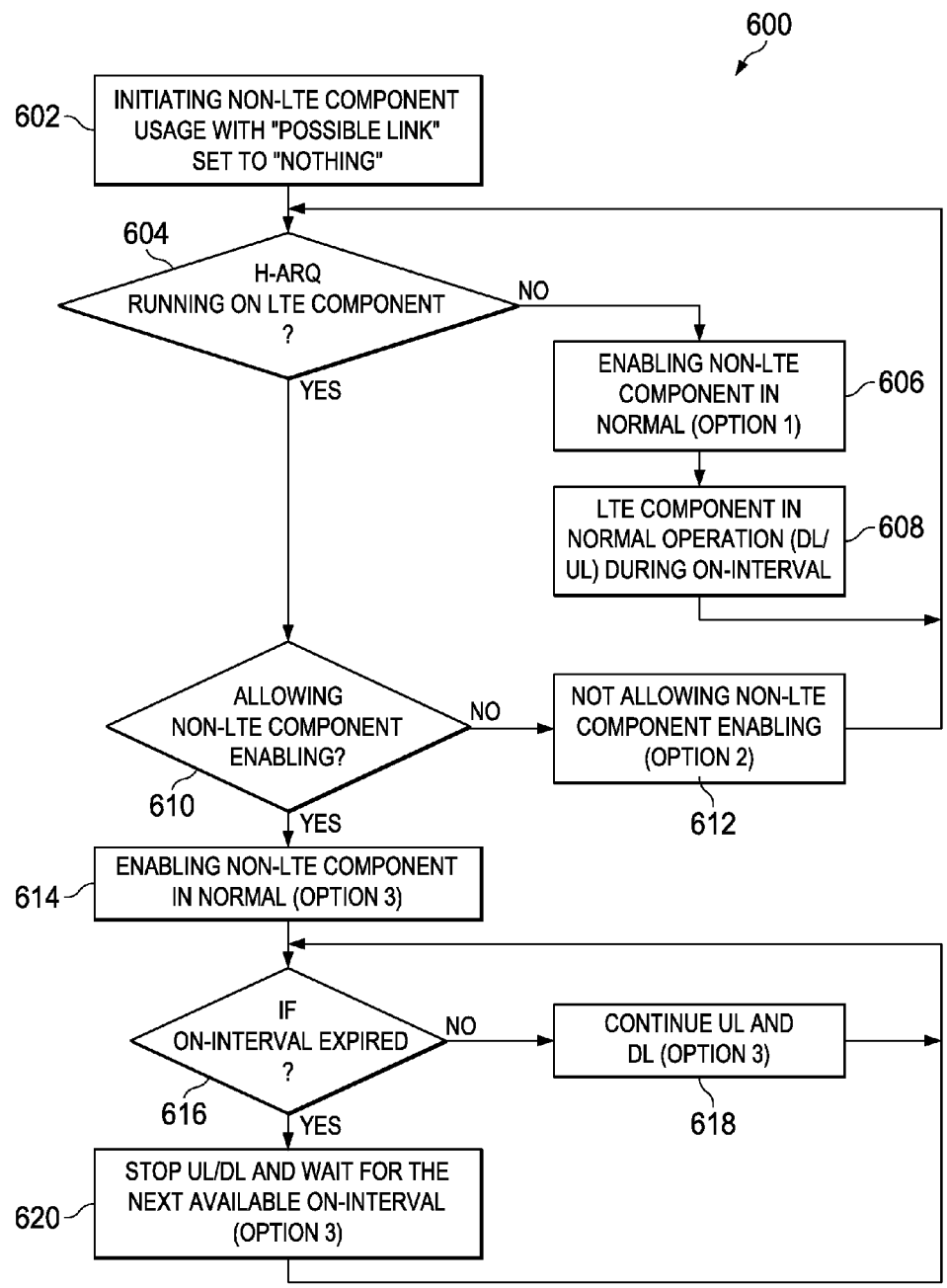
FIG. 6 is a flow chart illustration of the handover signaling call flow having a fixed on-interval with the "Possible Link" set to a first value indicating that no LTE device signal reception is expected during an Off-Interval.

To illustrate an example embodiment of the proposed HARQ signaling scheme having a fixed On-interval, reference is made to FIG. 6 which shows a flow chart of the handover signaling call flow 600 having a fixed on-interval with the "Possible Link" set to a first value indicating that no LTE component signal reception is expected during when the ISM component is activated.

At step 602, the signal flow 600 begins when the UE device generates a control signal message and/or information element in which the Possible Link field is set to "Nothing" to reflect the scenarios where the LTE component at the UE is coexisting with ISM components without LTE signal interference during non-LTE component signaling. In this case, there are three scenarios to address in order to ensure no coexistence interference issues.

In the first scenario, the UE determines at step 604 if a HARQ process is already running on an LTE component. If not (negative outcome to decision 604), the UE's LTE component is not in data transmission mode, and the non-LTE component can be easily initiated without additional operations to avoid coexistence interference. Accordingly, the UE enables the non-LTE component at the expiration of the fixed On-interval for the LTE component (step 606). As will be appreciated, the UE may confirm that the non-LTE component is enabled by exchanging the request and response messages with the eNB. In addition, the UE enables the LTE component to operate in normal mode to send and receive DL/UP data during the fixed On-interval for the LTE component (step 608).

In the second scenario where the HARQ process on the LTE component has been detected (affirmative outcome to decision 604), the UE determines at step 610 if the non-LTE component can be enabled. If enablement is not allowed (negative outcome to decision 610), the UE is prohibited from initiating the non-LTE component, such as when the LTE component is in data transmission status (e.g., HARQ is running). The decision to prevent enabling of the non-LTE component (step 612) allows the all resources of the UE to be allocated to the LTE component, and the non-LTE component is instructed to wait until the next available time interval when the LTE HARQ has been completed by the LTE component.

On the other hand, if the UE determines that the non-LTE component can be enabled (affirmative outcome to decision 610), the UE is enables the non-LTE component at the expiration of the fixed On-interval for the LTE component (step 614). In this third scenario, HARQ related operations for LTE component are performed only during the fixed On-interval. This operation may be implemented at step 618 by performing HARQ operations (e.g., ACK/NACK, retransmission, residual buffer etc.) for DL, UL or both for so long as the On-interval has not expired (negative outcome to decision 616). However, once the current On-interval expires (affirmative outcome to decision 616), any still pending HARQ operations are suspended or postponed to the next available On-interval or simply withdrawn. In selected embodiments, when there is no HARQ feedback that can be exchanged due to the expiration of the fixed On-interval, the network may be configured to assume that an ACK is received from the LTE component for the DL HARQ transmission. For the UL HARQ transmission, the LTE component may be configured to assume that a NACK is received from the network.

Figure 7:
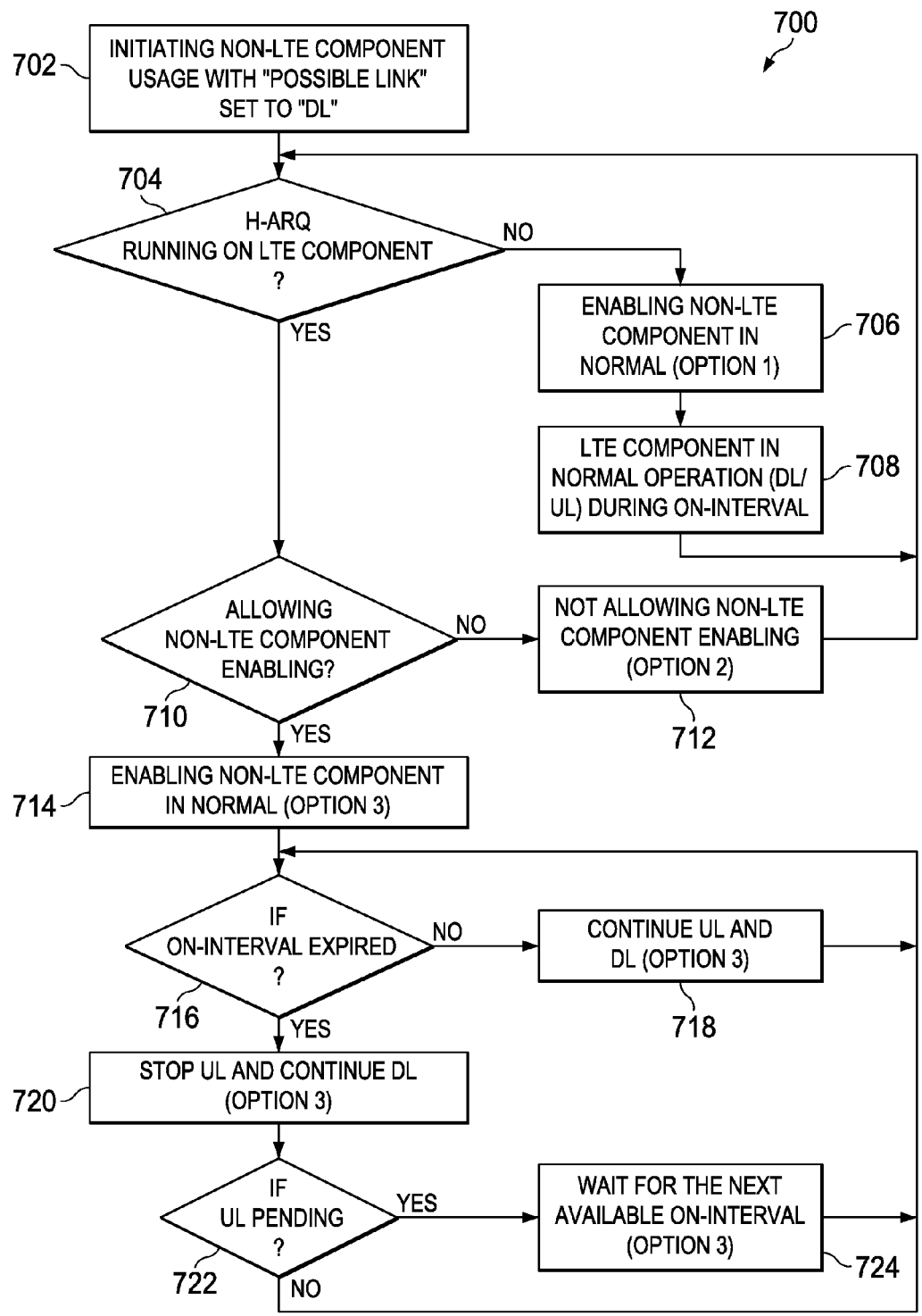
FIG. 7 is a flow chart illustration of the handover signaling call flow having a fixed on-interval with the "Possible Link" set to a second value indicating that downlink LTE device signal reception is expected during an Off-Interval.

To illustrate another example embodiment of the proposed HARQ signaling scheme having a fixed On-interval, reference is now made to FIG. 7 which shows a flow chart of the handover signaling call flow 700 having a fixed on-interval with the "Possible Link" set to a second value (e.g., DL) indicating that downlink LTE device signal reception is expected during the Off-interval. In this case, downlink reception from the eNB may be still allowed during the Off-interval. In cases where the UE includes a GPS component that is always in a reception state, the DL link activity indication could be used to allow the LTE component to receive a DL signal from the eNB without giving any interference to GPS component.

At step 702, the signal flow 700 begins when the UE device generates a control signal message and/or information element in which the Possible Link field is set to "DL" to reflect the scenarios where the downlink LTE device signal reception is expected during the Off-interval. In this case, there are three scenarios to address in order to ensure no coexistence interference.

In the first scenario, the UE determines at step 704 if a HARQ process is already running on an LTE component. If not (negative outcome to decision 704), the UE's LTE component is not in data transmission mode, so the UE enables the non-LTE component at the expiration of the fixed On-interval for the LTE component (step 706), and enables the LTE component to operate in normal mode to send and receive DL/UP data during the fixed On-interval for the LTE component (step 708). The negotiation procedures for obtaining the coexistence parameters should be performed before initiating of non-LTE components.

In the second scenario where the HARQ process on the LTE component has been detected (affirmative outcome to decision 704), the UE determines at step 710 if the non-LTE component can be enabled. If enablement is not allowed (negative outcome to decision 710), the UE is prohibited from initiating the non-LTE component (step 712), thereby providing full resource allocation to the LTE component. At this point, the non-LTE component is instructed to wait until the next available time interval when the LTE HARQ has been completed by the LTE component.

In the third scenario, the UE determines that the non-LTE component can be enabled (affirmative outcome to decision 710) and that the non-LTE component can be enabled (step 714). In this case, HARQ-related operations for LTE component are performed only during the fixed On-interval except as described below. In particular, HARQ operations (e.g., ACK/NACK, retransmission, residual buffer etc.) for DL, UL or both are performed (step 718) for so long as the On-interval has not expired (negative outcome to decision 716). However, once the current On-interval expires (affirmative outcome to decision 716), any still pending HARQ uplink operations are suspended or postponed to the next available On-interval or simply withdrawn (step 720). In addition, if the UE detects that there are still pending HARQ downlink signaling and traffic from the eNB (affirmative outcome to decision 722), they will be allowed during the current fixed On-interval and may also be performed during Off-interval. In other embodiments, any pending HARQ downlink signaling and traffic from the eNB at the end of the current fixed On-interval will be postponed to the next available On-interval (step 724). In selected embodiments, when there is no HARQ feedback that can be exchanged due to the expiration of the On-interval, for the DL H-ARQ transmission, the network will assume an ACK is received from the LTE component. For the UL H-ARQ transmission, the LTE component will assume an NACK is received from the network.

In connection with the disclosed signaling scheme for separating the LTE and non-LTE signaling in time, there is also disclosed herein a HARQ scheme which implements a variable On-interval in a coexistence operation mode of a UE device to help avoid coexistence interference and provide more chances of data transmission/reception and efficient H-ARQ operations (e.g. quick Ack/Nack feedback, residual buffer and any pending actions etc.). The provision of a variable or extendable LTE On-interval is useful when the LTE component is the primary component on the in-device platform since it allows the UE to be configured to maximize the time resource allocated to the LTE component. In this arrangement, HARQ procedures are configured to operate only during variable on-interval in the coexistence operation mode, depending on the activity status of the non-LTE components, thereby enabling the non-LTE components to operate during the Off-intervals without interference from the in-device LTE components or the HARQ-related signaling. To support variable On-interval operation, timers and information elements are disclosed for maximizing the available time interval for LTE components during H-ARQ operation while still providing a guaranteed time interval for non-LTE components. This operation can also be useful for other operations such as UL grant reception and RACH procedure.

In accordance with selected embodiments, there is shown in Table 7 (below) additional details of the proposed messages and/or information elements which are exchanged between the network and the mobile device for establishing a flexible or variable mode of operation to enable coexistence operation between LTE and non-LTE components (e.g., ISM and GPS). Alternatively, new information elements are defined which may be inserted in existing RRC messages to provide the flexible or variable mode of operation. The network could also configure the UE to operate in the variable On-interval operation by many other means, for example, via the pre-configured or pre-set settings, etc.

TABLE 7

Proposed new information elements for variable On-interval operation

| Information Elements | CoExist-REQ (UE) | CoExistDeact-REQ (UE) | CoExist-RSP (eNB) | CoExistDeact-RSP (eNB) | Remarks |
|---|---|---|---|---|---|
| Action | Set | Reset | Set | Reset (eNB can send in unsolicited way) | Message action |
| Start Time Offset | SFN/subframe/ Slot or time | Immediately or SFN/subframe/ slot or time | N/A | Immediately or SFN/subframe/ slot or time | Beginning time of coexistence start/end operation |
| Keeping Time | SFN/subframe/ slot or time | N/A | SFN/subframe/ slot or time | N/A | Ending time of coexistence |
| Initial On- | SFN/subframe/ | N/A | SFN/subframe/ | N/A | Initial Activating time |

TABLE 7-continued

Proposed new information elements for variable On-interval operation

| Information Elements | CoExist-REQ (UE) | CoExistDeact-REQ (UE) | CoExist-RSP (eNB) | CoExistDeact-RSP (eNB) | Remarks |
|---|---|---|---|---|---|
| interval | slot or time | | slot or time | | interval for LTE component |
| Coexistence Cycle | SFN/subframe/ slot or time | N/A | SFN/subframe/ slot or time | N/A | Periodic repetition of On-interval followed by a period of Off-interval |
| Maximum Ratio | SFN/subframe/ slot/time or % | N/A | SFN/subframe/ slot/time or % | N/A | Max. On-interval ratio in Coexistence cycle |
| Possible Link | Nothing, Tx, Rx or both | N/A | Nothing, Tx, Rx or both | N/A | Possible LTE component link over Off-interval |
| Extension | Enable or disable | N/A | Enable or disable | N/A | Usage of Fixed or Variable On-interval |

Under each message (CoExist-REQ, CoExistDeact-, CoExist-RSP, CoExistDeact-RSP) listed in Table 7, there is shown an information element parameter (Action, Start Time Offset, Keeping Time, Initial On-Interval, Coexistence Cycle, Maximum Ratio, Possible Link, and Extension) which provides the function or operation described in the "remarks" column. The operation and functionality of the messages and information elements is the same as in FIG. 5, except for the addition of the Coexistence Cycle, Maximum Ratio, and Extension elements or parameters that can be used to provide variable On-interval operation.

The Coexistence Cycle field or parameter specifies the periodic repetition of On-interval followed by a period of Off-interval. The value may be specified by system frame number (SFN), subframe, slot or actual time, or even as a multiple of the On-Interval value. However specified, the Coexistence Cycle field or parameter enables the LTE UE to have more flexible time duration over the Coexistence Cycle field or parameter be effectively extending the duration of the On-interval in relation to the Off-interval.

The Initial On-interval field or parameter indicates the initial time interval during which LTE component is activated, and may be specified by SFN, subframes, slots, etc. In selected embodiments, the Initial On-interval value can be extended based on the Coexistence Cycle field/parameter for HARQ operations and other required operations for DL and UL of LTE component.

While the Coexistence Cycle field/parameter provides flexibility to extend the On-interval for the LTE component, it will be appreciated that this flexibility negatively impacts the time resources available for non-LTE components. Therefore, the Maximum Ratio parameter is provided to protect non-LTE components by preventing excessive resource allocation to the LTE component and to make sure that minimum time resources is allocated for non-LTE component. The Maximum Ratio field/parameter can be specified in any desired time unit (SFN, subframe, slot, time or percentile), as a multiple, as a ratio, or as desired. However specified, the Maximum Ratio field/parameter is used by the UE to prevent the On-interval from being extended past the Maximum Ratio value. In operation, if an extended On-interval reaches the Maximum Ratio value, the On-interval is terminated and the Off-interval will start so that time resources for non-LTE component can be guaranteed.

The Extension field/parameter indicates whether the UE is using a fixed or variable On-interval. If this field is set to "Enable," the LTE component uses a variable On-interval, but if the Extension field/parameter is reset, the LTE component uses a fixed On-interval operation.

As will be appreciated, there a variety of ways to limit or control the amount of extensions that can be provided to the variable On-interval, including using timers and counters to keep track of the extension(s). For example, a Coexistence Timer may be maintained (e.g., at the UE, eNB or both) to count the number of time extensions and make sure it does not exceed a specified timer limit for the extended On-interval time. While the specified timer limit value may be set by the signaling message(s) with the parameters shown in Table 7, the timer limit may also be pre-configured or pre-set. In operation and as shown below in Table 8, the Coexistence Timer may include a specified timer limit, as well as one or more start events and end events.

TABLE 8

Coexistence Timer and its usage for variable On-interval operation

| Timer | Units | Start | End |
|---|---|---|---|
| Coexistence Timer | # of consecutive PDCCH-subframe or time | 1) PDCCH indicates a DL or UL data transmission<br>2) Waiting UL grant<br>3) Pending Ack/Nack transmission<br>4) RACH procedure is pending<br>5) A scheduling Request sent on PUCCH is pending | 1) Reach the Maximum Ratio<br>2) No Data indication on this subframe<br>3) No pending Ack/Nack on this subframe |

In the example depicted in Table 8, the Coexistence Timer has a timer limit that is specified with a Units value (e.g., the number of consecutive PDCCH-subframes or time duration). The Coexistence Timer starts when a specified Start event occurs, such as (1) when the PDCCH indicates that there is a downlink or uplink data transmission, or (2) when the UE is awaiting a uplink grant, or (3) when there is a pending ACK/NACK signal, or (4) when a RACH procedure is pending, or (5) when there is pending scheduling request sent on PUCCH. Similarly, the Coexistence Timer stops or ends when a specified End event occurs, such as 1) when the number of units reaches the Maximum Ratio, or 2) when there is a No Data indication on this subframe, or 3) when there is no pending Ack/Nack on this subframe.

With the depicted Coexistence Timer, the On-interval can be extended beyond the Initial On-interval when Coexistence Timer is running. In addition to setting the Units value, the eNB can configure which triggering events in Table 8 are used. In operation, if the specified time limit for the Coexistence Timer is greater than the remaining On-interval time, the actual On-interval time is extended until the Coexistence Timer expires. Otherwise, the current On-interval is used. This time extension can be repeated whenever an event is triggered until the Maximum Ratio value is reached. In the following sections, we describe the details of variable On-interval operation based on different settings of Possible Link.

Figure 8:
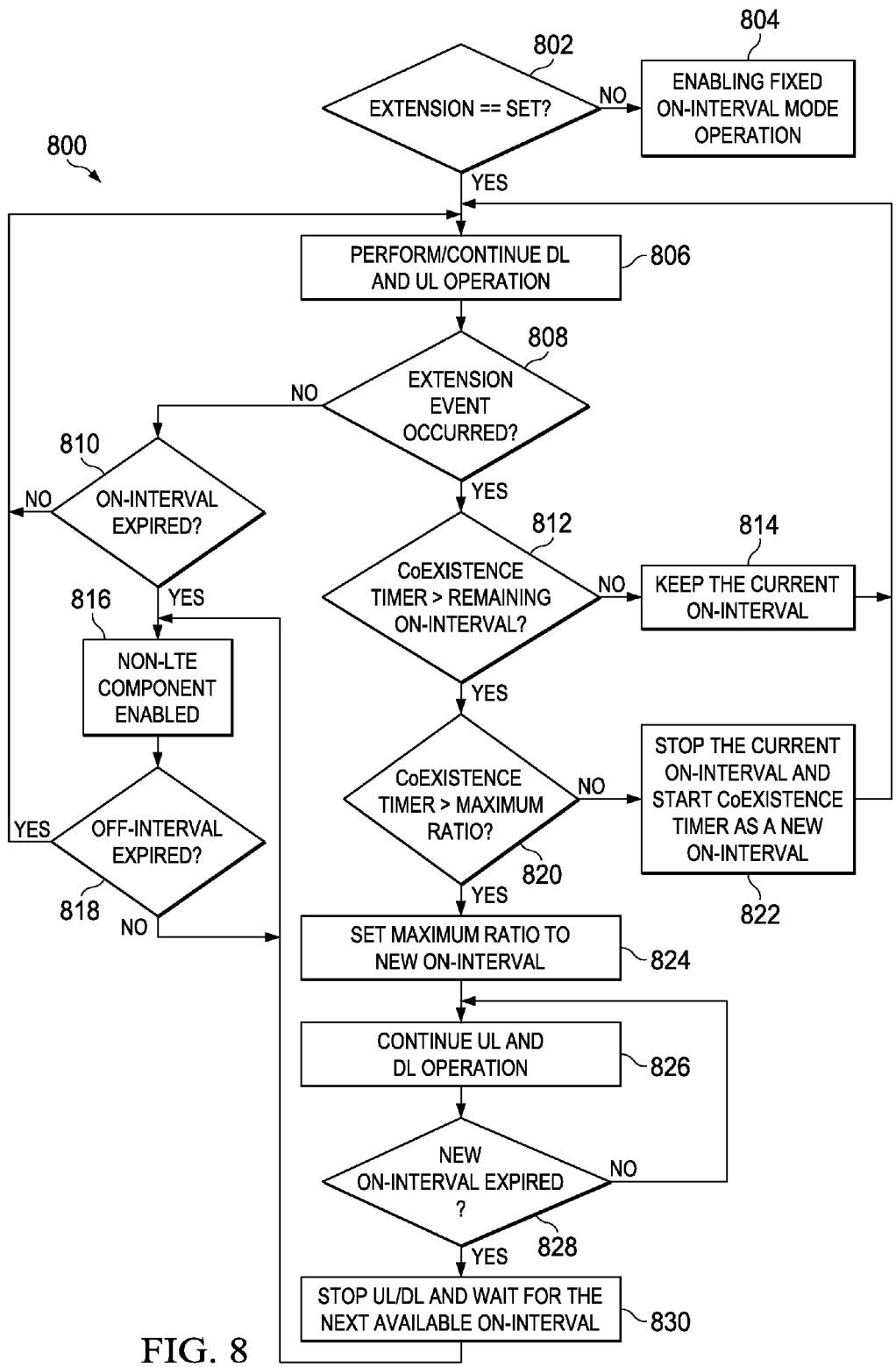
FIG. 8 is a flow chart illustration of the handover signaling call flow having a variable on-interval with the "Possible Link" set to a first value indicating that no LTE device signal reception is expected during an Off-Interval.

To illustrate an example embodiment of the proposed HARQ signaling scheme having a variable On-interval, reference is made to FIG. 8 which shows a flow chart of the handover signaling call flow 800 having a variable on-interval with the "Possible Link" set to a first value (e.g., "Nothing") indicating that no LTE component signal reception is expected when the ISM component is activated.

At step 802, the signal flow 800 begins when the UE device determines if the Extension parameter/field is set in the control signal message and/or information element. If not (negative outcome to decision 802), the variable On-interval operation is not enabled, and the LTE component uses a fixed On-interval operation (804). On the other hand, if the Extension field/parameter is set to "Enable" (affirmative outcome to decision 802), the LTE component uses a variable On-interval operation to perform downlink and uplink operations (step 806).

At step 808, the UE determines if an extension event has occurred for purposes of extending the On-interval. If there is no Start event detected (negative outcome to decision 808), the DL/UL operations continue on the LTE component (step 806) if the On-interval has not expired (negative outcome to decision 810). But once the On-interval expires (affirmative outcome to decision 810), the non-LTE component is enabled (step 816) and non-LTE signaling proceeds during the Off-interval for so long as the Off-interval has not expired (negative outcome to decision 818). Once the Off-interval timer expires (affirmative outcome to decision 818), the DL/UL operations continue on the LTE component during the On-interval (step 806).

On the other hand, if the UE determines that an extension event has occurred (affirmative outcome to decision 808), the On-interval may be extended. For example, if HARQ is running on the LTE component while the Extension field/parameter in the message is set to "1," the On-interval can be extended upon occurrence of an extension event (affirmative outcome to decision 808) by comparing Coexistence Timer with the remaining On-interval (step 812). If the timer comparison step 812 indicates that the Coexistence Timer has less time than is remaining on the On-interval (negative outcome to decision 812), the current On-interval is kept (step 814) for purposes of continuing the DL/UL operation (step 806). However, if the timer comparison step 812 indicates that the Coexistence Timer has more time than is remaining on the On-interval (affirmative outcome to decision 812), the UE proceeds to step 820.

At step 820, the UE determines if the Coexistence Timer has exceeded the Maximum Ratio value. In selected embodiments, the On-interval timer (and any extension) may be processed and evaluated using absolute time values. In such cases, the UE maintains an internal parameter to keep track of time accumulation in the extended On-interval for comparison with the Maximum Ratio value. But if relative time flow is applied (e.g. the new On-interval starts at the current time flow), the total time for the On-interval can be calculated without accumulation. In this case, if the UE determines that the Coexistence Timer has not exceeded the Maximum Ratio value not (negative outcome to decision 820), the current On-interval is stopped and the Coexistence Timer is started as a new On-interval (step 822) before resuming the DL/UL operations on the LTE component with the new (extended) On-interval (step 806). However, if the Coexistence Timer exceeds the Maximum Ratio value (affirmative outcome to decision 820), the Maximum Ratio value is set as the new On-interval (step 824) and the DL/UL operations are continued on the LTE component with the new On-interval (step 826) until the UE detects that the new On-interval has expired (affirmative outcome to decision 828), at which point the DL/UL operations are stopped to wait for the next available On-interval (step 830). In this way, the Maximum Ratio provides at least part of the Off-interval for non-LTE components so that, even when there are some pending DL/UL operations of LTE component, they will not continue until next available On-interval.

Figure 9:
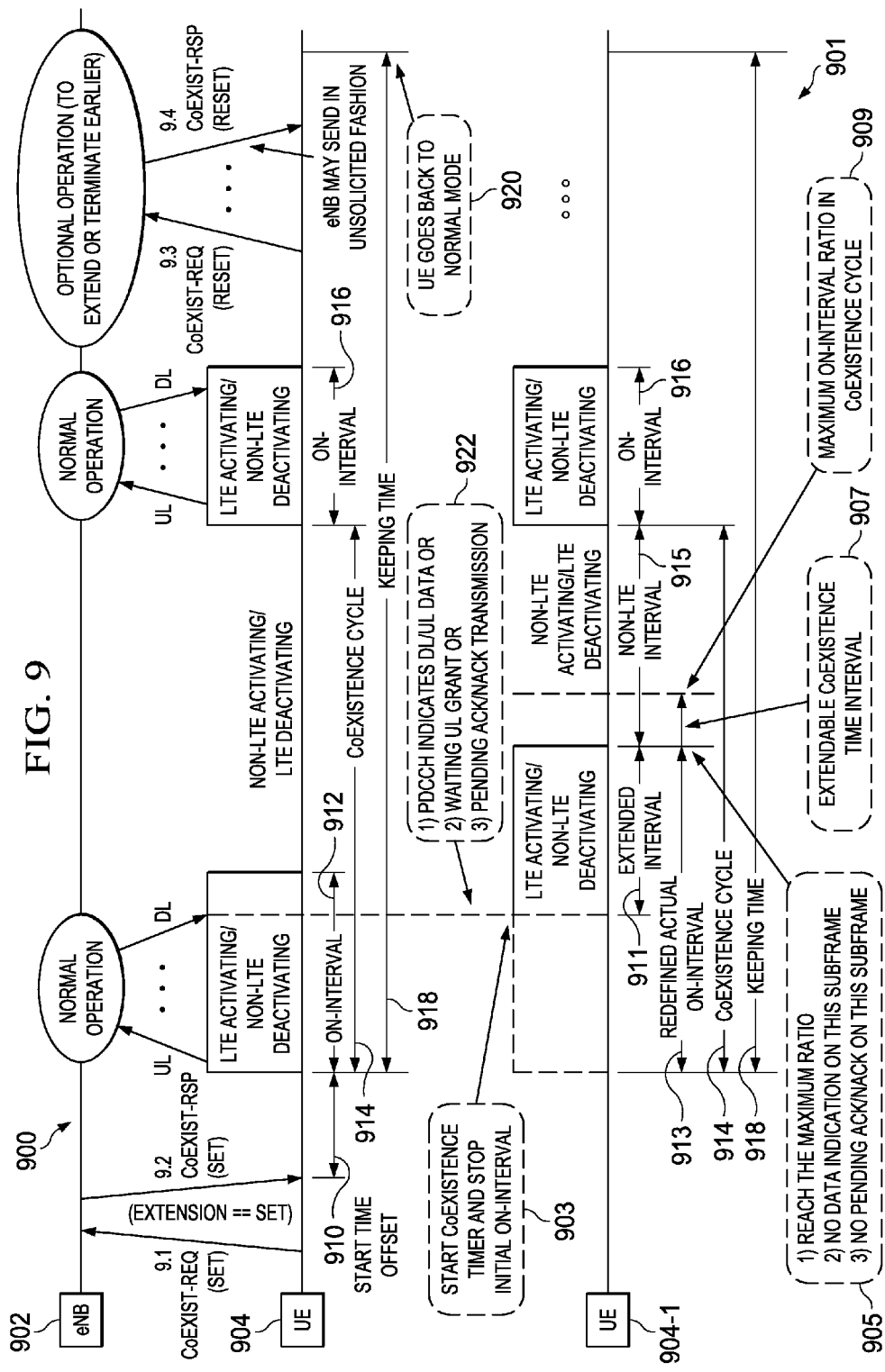
FIG. 9 is a signal flow diagram showing the handover signaling call flow operation using a variable on-interval with the "Possible Link" set to a first value indicating that no LTE device signal reception is expected during an Off-Interval.

Turning now to FIG. 9, there is illustrated a signal timing flow 900 for establishing a coexistence operation mode with HARQ operations using a variable on-interval between eNB device 302 and UE device 304 having LTE and ISM components. The expected coexistence operation mode is set up by exchanging request and response messages in which the "Possible Link" setting in the coexistence parameters is set to a first value indicating that no LTE device signal reception is expected during the Off-interval. First, the UE 904 sends a first request message 9.1 (e.g., CoExist-REQ message) to the eNB 902 with proposed coexistence parameters, such as start time (e.g., Start Time Offset 910), end time (e.g., Keeping Time 918), On-interval 912, Coexistence Cycle 914, Maximum Ratio, and Extension field. In addition, the Possible Link field may be set to "Nothing" (e.g., "00") for LTE and ISM components to signify that no LTE signal reception is expected when the ISM component(s) are activated. In the response message 9.2 (e.g., CoExist-RSP message), the proposed parameters are accepted, repeated or modified so that the UE 904 and eNB 902 are configured to establish a coexistence operation mode having defined On-interval(s) 912, 916 during which the LTE component is in normal operation mode when the activated LTE component in the UE 904 sends uplink data to the eNB 904 and receives downlink data from the eNB 902, and the non-LTE component(s) are disabled and turned off. The established coexistence operation mode also has an Off-interval which is defined as the part of the Coexistence Cycle 914 which is not allocated to the On-interval 912. In the Off-interval, the LTE component is disabled and the non-LTE component(s) are enabled to transmit and receive signals.

While the depicted On-intervals and Off-intervals may each have an initial time duration and periodicity that repeat until expiration of the Keeping Time 918, the coexistence parameters provided in the request and response messages 9.1, 9.2 allow the On-interval to be extended repeatedly until the Maximum Ratio in current Coexistence Cycle is reached. For example, the eNB 902 can configure the UE 904 to use a variable On-interval by sending the response message 9.2 (e.g., a CoExist-RSP message) with the Extension field set to "1" based on application, traffic status and etc. When configured to use a variable On-interval, the UE 904-1 operates as normal by using the Start Time Offset 910 to establish an initial On-interval for LTE signalling. However, when an extension event 922 is detected, the UE 904-1 extends the On-interval. Examples of extension events include receiving a PDCCH indication of downlink or uplink data, waiting for an uplink grant, or a pending ACK/NACK transmission.

Upon detecting the extension event, the UE 904-1 starts the Coexistence Timer and stops the Initial On-Interval (903), thereby providing an extended interval 911 to the initial On-interval to result in an extended On-interval 913. The extensions can be repeatedly granted until an end event is detected (905) or the Maximum Ratio value limit (909) is reached, whichever occurs first. Examples of end events include receiving an indication for a given subframe that there is no data or no pending ACK/NACK. In FIG. 9, the extended On-interval 913 is shown as being limited by a detected end event 905, after which the non-LTE interval 9156 is provided as the balance of the Coexistence Cycle 914. To prevent extensions from using the entirety of the Coexistence Cycle 914, the Maximum Ratio value is used by the UE 904-1 to limit the amount of extensions available for LTE activation to a predetermined portion of the Coexistence Cycle 914. As shown in FIG. 9, the UE 904-1 could possibly extend the On-interval to include the Extendable Coexistence time interval 907 up to the Maximum On-interval 909 defined as the product of the Maximum Ratio value and the Coexistence Cycle. However, once the extended On-interval is terminated, the LTE component is deactivated until the next On-interval 916 which returns to the Initial On-interval value, and the process repeats until the end of the Keeping Time 918 is reached when the UE 904-1 returns to normal LTE mode 920 with the non-LTE components deactivated.

Figure 10:
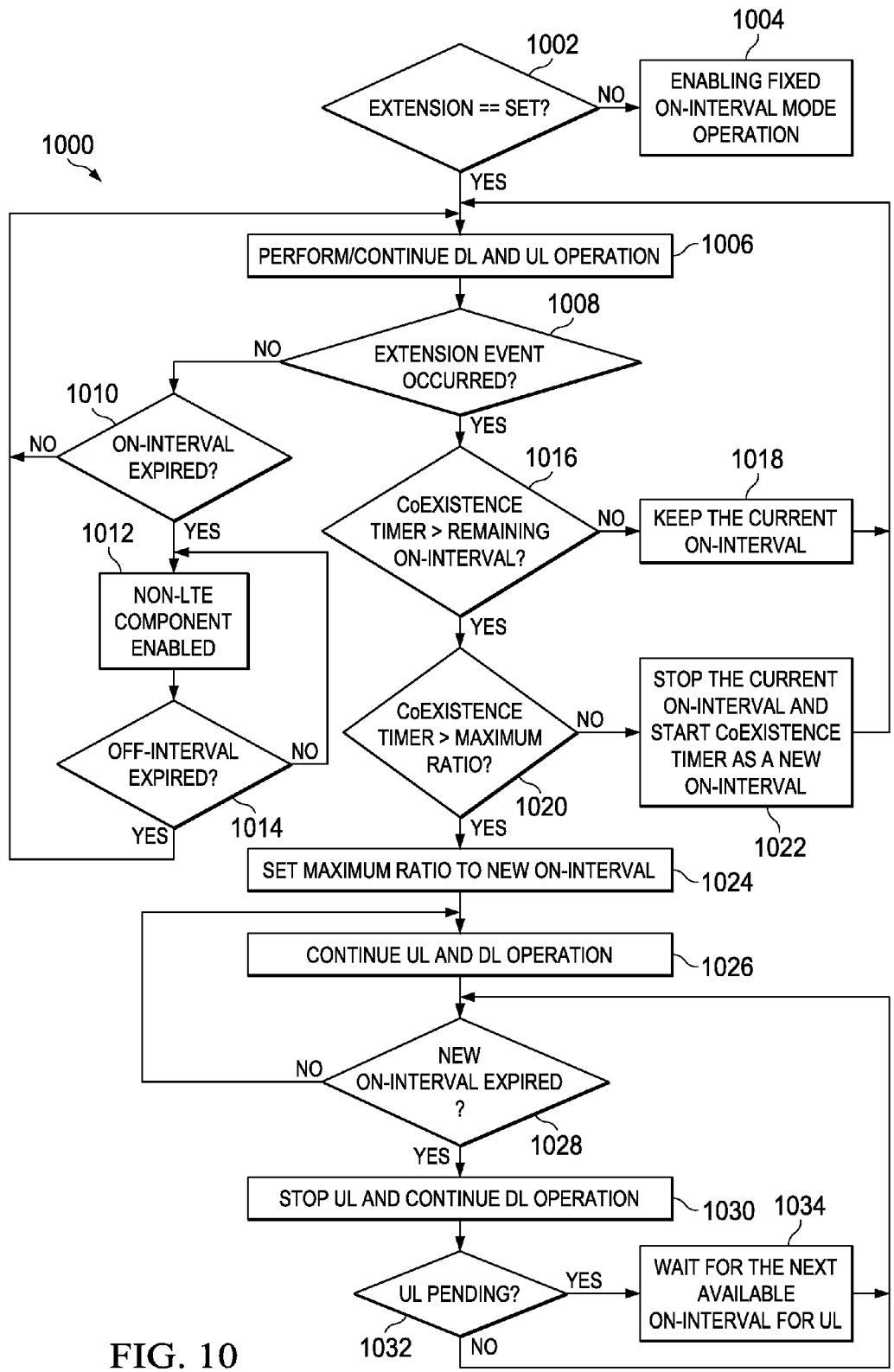
FIG. 10 is a flow chart illustration of the handover signaling call flow having a variable on-interval with the "Possible Link" set to a second value indicating that downlink LTE device signal reception is expected during an Off-Interval.

FIG. 10 is a flow chart illustration of the handover signaling call flow having a variable on-interval with the "Possible Link" set to a second value indicating that downlink ISM device signal reception is expected;

To illustrate another example embodiment of the proposed HARQ signaling scheme having a variable On-interval, reference is made to FIG. 10 which shows a flow chart of the handover signaling call flow 1000 having a variable on-interval with the "Possible Link" set to a second value (e.g., "downlink") indicating that LTE downlink signal reception is expected during the Off-interval. This configuration can be effectively applied to a UE device which includes both LTE and GPS components.

At step 1002, the signal flow 1000 begins when the UE device determines if the Extension parameter/field is set in the control signal message and/or information element. If not (negative outcome to decision 1002), the variable On-interval operation is not enabled, and the LTE component uses a fixed On-interval operation (1004). On the other hand, if the Extension field/parameter is set to "Enable" (affirmative outcome to decision 1002), the LTE component uses a variable On-interval operation to perform downlink and uplink operations (step 1006).

At step 1008, the UE determines if an extension event has occurred for purposes of extending the On-interval. If there is no Start event detected (negative outcome to decision 1008), the DL/UL operations continue on the LTE component (step 1006) if the On-interval has not expired (negative outcome to decision 1010). But once the On-interval expires (affirmative outcome to decision 1010), the non-LTE component is enabled (step 1012) and non-LTE signaling proceeds during the Off-interval for so long as the Off-interval has not expired (negative outcome to decision 1014). Once the Off-interval timer expires (affirmative outcome to decision 1014), the DL/UL operations continue on the LTE component during the On-interval (step 1006).

On the other hand, if the UE determines that an extension event has occurred (affirmative outcome to decision 1008), the On-interval may be extended. For example, if HARQ is running on the LTE component while the Extension field/parameter in the message is set to "1," the On-interval can be extended upon occurrence of an extension event (affirmative outcome to decision 1008) by comparing Coexistence Timer with the remaining On-interval (step 1016). If the timer comparison step 1016 indicates that the Coexistence Timer has less time than is remaining on the On-interval (negative outcome to decision 1016), the current On-interval is kept (step 1018) for purposes of continuing the DL/UL operation (step 1006). However, if the timer comparison step 1016 indicates that the Coexistence Timer has more time than is remaining on the On-interval (affirmative outcome to decision 1016), the UE proceeds to step 1020.

At step 1020, the UE determines if the Coexistence Timer has exceeded the Maximum Ratio value. If the UE determines that the Coexistence Timer has not exceeded the Maximum Ratio value not (negative outcome to decision 1020), the current On-interval is stopped and the Coexistence Timer is started as a new On-interval (step 1022) before resuming the DL/UL operations on the LTE component with the new (extended) On-interval (step 1006). However, if the Coexistence Timer exceeds the Maximum Ratio value (affirmative outcome to decision 1020), the Maximum Ratio value is set as the new On-interval (step 1024) and the DL/UL operations are continued on the LTE component with the new On-interval (step 1026) until the UE detects that the new On-interval has expired (affirmative outcome to decision 1028), at which point the downlink operations are continued during the Off-interval and the uplink operations are stopped (step 1030) to wait for the next available On-interval (step 1034) for so long as there are pending uplink operations (affirmative outcome to decision 1032). In this way, the Maximum Ratio provides at least part of the Off-interval for non-LTE components so that, even when there are some pending DL/UL operations of LTE component, they will not continue until next available On-interval.

Figure 11:
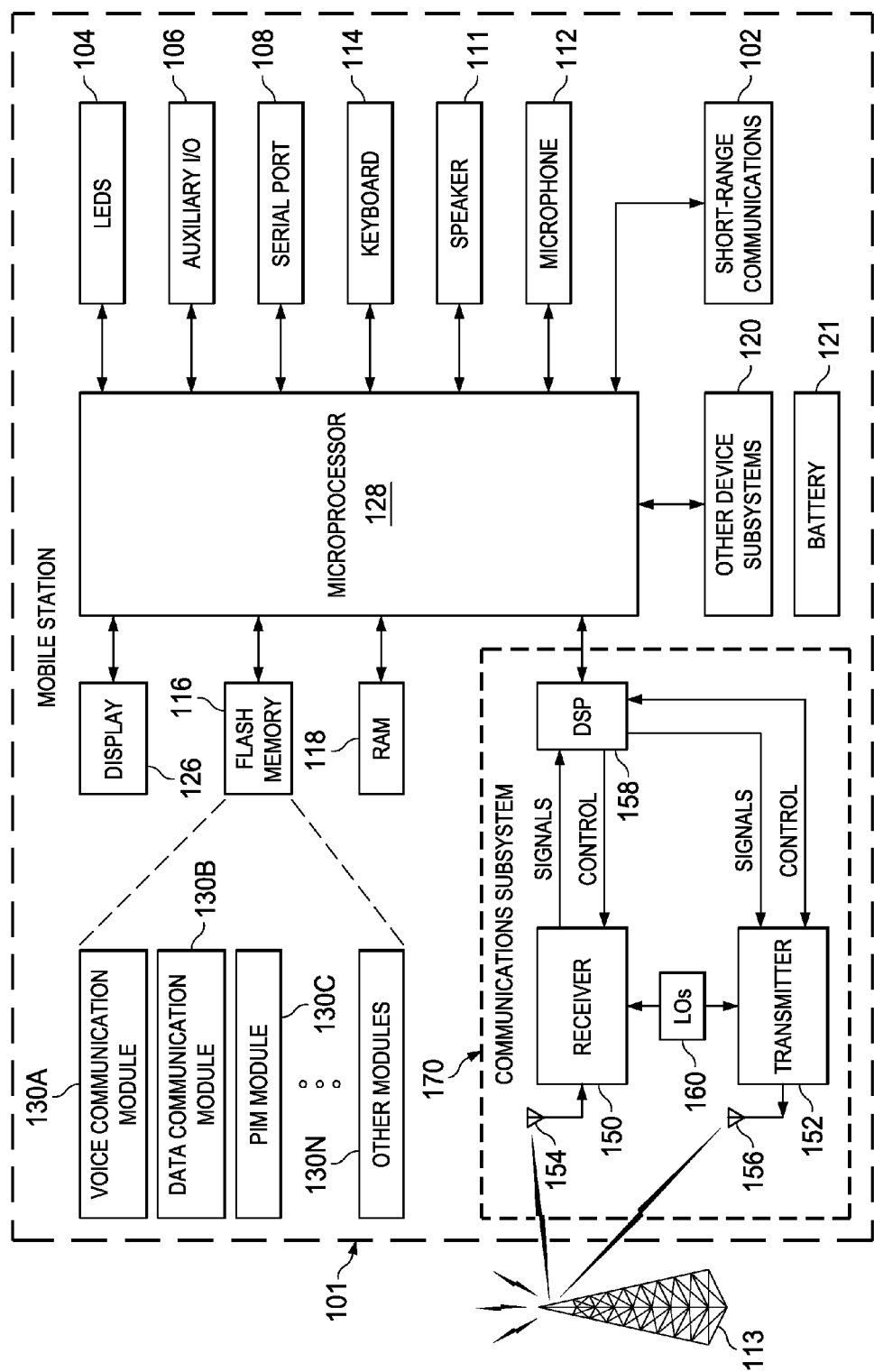
FIG. 11 is a schematic block diagram illustrating exemplary components of a mobile wireless communications device which may be used with selected embodiments of the present invention.

Referring now to FIG. 11, there is shown a schematic block diagram illustrating exemplary components of a mobile wireless communications device 101 which may be used with selected embodiments of the present invention. The wireless device 101 is shown with specific components for implementing features described above. It is to be understood that the wireless device 101 is shown with very specific details for exemplary purposes only.

A processing device (e.g., microprocessor 128) is shown schematically as coupled between a keyboard 114 and a display 126. The microprocessor 128 controls operation of the display 126, as well as overall operation of the wireless device 101, in response to actuation of keys on the keyboard 114 by a user.

The wireless device 101 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the wireless device 101 are shown schematically. These include a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The wireless device 101 may have a battery 121 to power the active elements of the wireless device 101. The wireless device 101 is in some embodiments a two-way radio frequency (RF) communication device having voice and data communication capabilities. In addition, the wireless device 101 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the wireless device 101 may also be stored to the RAM 118.

The microprocessor 128, in addition to its operating system functions, enables execution of software applications on the wireless device 101. A predetermined set of software applications that control basic device operations, such as a voice communications module 130A and a data communications module 130B, may be installed on the wireless device 101 during manufacture. In addition, a personal information manager (PIM) application module 130C may also be installed on the wireless device 101 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

Communication functions, including data and voice communications, are performed through the communication subsystem 170, and possibly through the short-range communications subsystem 102. The communication subsystem 170 includes a receiver 150, a transmitter 152 and one or more antennas, illustrated as a receive antenna 154 and a transmit antenna 156. In addition, the communication subsystem 170 includes a processing module, such as a digital signal processor (DSP) 158, and local oscillators (LOs) 160. In some embodiments, the communication subsystem 170 includes a separate antenna arrangement (similar to the antennas 154 and 156) and RF processing chip/block (similar to the Receiver 150, LOs 160 and Transmitter 152) for each RAT, although a common baseband signal processor (similar to DSP 158) may be used for baseband processing for multiple RATs. The specific design and implementation of the communication subsystem 170 is dependent upon the communication network in which the wireless device 101 is intended to operate. For example, the communication subsystem 170 of the wireless device 101 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1X and 1x EV-DO. The communication subsystem 170 may also be designed to operate with an 802.11 Wi-Fi network, and/or an 802.16 WiMAX network. Other types of data and voice networks, both separate and integrated, may also be utilized with the wireless device 101.

Network access may vary depending upon the type of communication system. For example, in the Mobitex™ and DataTAC™ networks, wireless devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the wireless device 101 may send and receive communication signals over the communication network 113. Signals received from the communication network 113 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 113 are processed (e.g., modulated and encoded) by the DSP 158 and are then provided to the transmitter 152 for digital to analog conversion, frequency up conversion, filtering, amplification and transmission to the communication network 113 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 113 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the wireless device 101. In addition, the display 126 may also be utilized in voice communication mode, for example, to display the identity of a calling party, the duration of a voice call, or other voice call related information.

The short-range communications subsystem 102 enables communication between the wireless device 101 and other proximate systems or devices, which need not necessarily be similar devices. For example, the short range communications subsystem may include an infrared device and associated circuits and components, or a Bluetooth™ communication module to provide for communication with similarly-enabled systems and devices.

By now it should be appreciated that there is disclosed herein a method for use in a radio access network (eNB) by user equipment (UE) having a first radio technology component (e.g., an LTE component) and a second radio technology component (e.g., a GPS or ISM) on a single platform. As disclosed, a coexistence request message is sent to convey one or more proposed control parameters for establishing a coexistence mode with first and second signaling intervals for the first and second radio technology components. A response message is received which uses an absolute or delta value configuration to convey one or more control parameters for establishing the first and second signaling intervals for the first and second radio technology components, where the first and second signaling intervals are alternated during the coexistence mode. The first radio technology component is enabled with the one or more control parameters to use radio resources on the UE during the first signaling interval without interference to/from the second radio technology component, and the second radio technology component is enabled with the one or more control parameters to use radio resources on the UE during the second signaling interval without interference to/from the first radio technology component. The coexistence request message may be sent by sending an RRC signaling message with one or more information elements appended to the RRC signaling message to convey the one or more proposed control parameters, where the proposed control parameters include a Start Time Offset parameter specifying a start time for a coexistence mode, a Keeping Time parameter specifying an end time for the coexistence mode, and On-Interval parameter specifying a time duration for the first signaling interval, an Off-Interval parameter specifying a time duration for the second signaling interval, and a Possible Link parameter specifying a type of activity of the first radio technology component during the second signaling interval. Alternatively, the coexistence request message may be sent by sending an RRC signaling message CoExist-REQ to convey proposed control parameters including a Start Time Offset parameter specifying a start time for a coexistence mode, a Keeping Time parameter specifying an end time for the coexistence mode, and On-Interval parameter specifying a time duration for the first signaling interval, an Off-Interval parameter specifying a time duration for the second signaling interval, and a Possible Link parameter specifying a type of activity of the first radio technology component during the second signaling interval. In selected embodiments, the UE receives the response message which includes a Keeping Time parameter set to a first value to indicate that the coexistence request message is rejected. If the control parameters from the response message are not accepted by the user equipment (UE), the UE may send a second coexistence request message to convey alternative proposed control parameters for establishing a coexistence mode with first and second signaling intervals.

In selected embodiments, the UE receives the response message by receiving an RRC signaling message (e.g., CoExist-RSP) conveying the one or more control parameters comprising a Start Time Offset parameter specifying a start time for a coexistence mode, a Keeping Time parameter specifying an end time for the coexistence mode, and On-Interval parameter specifying a time duration for the first signaling interval, an Off-Interval parameter specifying a time duration for the second signaling interval, and a Possible Link parameter specifying a type of activity of the first radio technology component during the second signaling interval, or by receiving an RRC signaling message with one or more information elements appended to the RRC signaling message to convey the one or more control parameters.

In selected embodiments, the UE sends an update message to convey one or more proposed control parameters for early terminating or extending the coexistence mode, and receives an update response message comprising one or more control parameters for early terminating or extending the coexistence mode. The update message may be sent by sending an RRC signaling message with one or more information elements appended to the RRC signaling message to convey the one or more proposed control parameters for early terminating or extending the coexistence mode, in which case the update response message is received as an RRC signaling message with one or more information elements appended to the RRC signaling message to convey the one or more control parameters for early terminating or extending the coexistence mode. Alternatively, the UE sends the update message as an RRC signaling message CoExist-REQ to convey the one or more proposed control parameters for early terminating or extending the coexistence mode, in which case the update response message is received as an RRC signaling message CoExist-RSP to convey the one or more control parameters for early terminating or extending the coexistence mode. In selected embodiments, an update message for early terminating or extending the coexistence mode is received without having been requested by the user equipment (UE). In selected embodiments, the update response message may be received as an RRC signaling message conveying a control parameter specifying a new end time for the coexistence mode. To conserve RRC signaling messages, the update message may be sent by sending the coexistence request message as an RRC signaling message to convey one or more proposed control parameters for early terminating or extending the coexistence mode, where the one or more proposed control parameters comprises an Action parameter having a first value when the coexistence request message conveys one or more proposed control parameters for establishing a coexistence mode, and having a second value when the coexistence request message conveys one or more proposed control parameters for early terminating or extending the coexistence mode.

In selected embodiments, the response message is received as an RRC signaling message conveying the one or more control parameters comprising a Possible Link parameter comprising a first value if no uplink or downlink activity is expected for the first radio technology component during the second signaling interval, a second value if only downlink activity is expected for the first radio technology component during the second signaling interval, a third value if only uplink activity is expected for the first radio technology component during the second signaling interval, or fourth value if both uplink and downlink activity is expected for the first radio technology component during the second signaling interval. In these embodiments, the first radio technology component may be enabled to perform HARQ uplink/downlink operations during the first signaling interval and to stop any remaining HARQ uplink/downlink operations during the second signaling interval and wait for a subsequent available first signaling interval if a Possible Link control parameter indicates that no uplink or downlink activity is expected for the first radio technology component during the second signaling interval. In these cases, the UE may assume an NACK is received from a radio access network (eNB) for HARQ UL transmission when no HARQ feedback is received during the first signaling interval. Also, the radio access network (eNB) may assume that an ACK is received from user equipment (UE) for HARQ DL transmission when no HARQ feedback is received during the first signaling interval. Alternatively, the first radio technology component may be enabled to perform HARQ uplink/downlink operations during the first signaling interval and to continue performing HARQ downlink operations during the second signaling interval but to stop any remaining HARQ uplink operations during the second signaling interval and wait for a subsequent available first signaling interval if a Possible Link control parameter indicates that downlink activity is expected for the first radio technology component during the second signaling interval.

In selected embodiments, the first and second radio technology components are enabled to alternately use the radio resources during first and second signaling intervals, respectively, during a Keeping Time interval for the coexistence mode. The Keeping Time interval may be established by receiving a response message comprising a Keeping Time parameter set to value to indicate how long the coexistence mode will be maintained, or may be determined from network implementation, or may be established by direct setup with MAC CE and RRC signaling.

In selected embodiments, the UE enables the second radio technology component to use radio resources on the UE during the second signaling interval without interference from the first radio technology component if a Possible Link control parameter indicates that no uplink or downlink activity is expected for the first radio technology component during the second signaling interval and if there is no HARQ operation operating on the first radio technology component. In addition or in the alternatively, the UE enables the second radio technology component to use radio resources on the UE during the second signaling interval until there is no HARQ operation operating on the first radio technology component if a Possible Link control parameter indicates that no uplink or downlink activity is expected for the first radio technology component during the second signaling interval.

In still further embodiments, there is disclosed a method for use in radio access network (eNB) to avoid interference between first and second radio technology components located on a single platform at a user equipment (UE) which includes receiving coexistence request messages and sending response messages for establishing first and second signaling intervals for the first and second radio technology components at the UE, where the first and second signaling intervals are alternated during the coexistence mode so that the first radio technology component at the UE can be enabled to use radio resources on the UE during the first signaling interval without interference to/from the second radio technology component, and so that the second radio technology component at the UE can be enabled to use radio resources on the UE during the second signaling interval without interference to/from the first radio technology component. In addition, the radio access network (eNB) receives update messages and/or sends update response messages to either terminate early or extend the coexistence mode. In operation, the radio access network (eNB) may send the user equipment (UE) downlink information for the first radio technology component during the second signaling interval if a Possible Link control parameter indicates that downlink activity is expected for the first radio technology component during the second signaling interval. In addition, the radio access network (eNB) may receive from the user equipment (UE) uplink information from the first radio technology component during the second signaling interval if a Possible Link control parameter indicates that uplink activity is expected for the first radio technology component during the second signaling interval. In addition, the radio access network (eNB) may sending the downlink information for the first radio technology component during the second signaling interval and receive uplink information from the first radio technology component during the second signaling interval if a Possible Link control parameter indicates that both uplink and downlink activity is expected for the first radio technology component during the second signaling interval.

In still further embodiments, computer program product is disclosed that includes a non-transitory computer readable storage medium having computer readable program code embodied therein with instructions which are adapted to be executed to implement a method for operating user equipment (UE) and/or a radio access network (eNB) in a coexistence mode, substantially as described hereinabove.

It should be understood that as used herein, terms such as coupled, connected, electrically connected, in signal communication, and the like may include direct connections between components, indirect connections between components, or both, as would be apparent in the overall context of a particular embodiment. The term coupled is intended to include, but not be limited to, a direct electrical connection.

Numerous modifications and variations of the present application are possible in light of the above teachings. It is therefore to be understood that within the scope of the appended claims, the embodiments of the application may be practiced otherwise than as specifically described herein.

Although the described exemplary embodiments disclosed herein are described with reference to a coexistence operation mode whereby different signaling components are separated in time to avoid coexistence interference, the present invention is not necessarily limited to the example embodiments which illustrate inventive aspects of the present invention that are applicable to a wide variety of signaling schemes and applications. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A method for use in user equipment (UE) comprising first and second radio technology components on a single platform, comprising:

sending a coexistence request message to convey one or more proposed control parameters for establishing a coexistence mode with first and second signaling intervals for the first and second radio technology components, where sending the coexistence request message comprises sending an RRC signaling message to convey the one or more proposed control parameters, and the one or more proposed control parameters comprise a Start Time Offset parameter specifying a start time for a coexistence mode, a Keeping Time parameter specifying an end time for the coexistence mode, and On-Interval parameter specifying a time duration for the first signaling interval, an Off-Interval parameter specifying a time duration for the second signaling interval, and a Possible Link parameter specifying a type of activity of the first radio technology component during the second signaling interval;

receiving a response message comprising one or more control parameters for establishing the first and second signaling intervals for the first and second radio technology components, where the first and second signaling intervals are alternated during the coexistence mode;

enabling the first radio technology component with the one or more control parameters to use radio resources on the UE during the first signaling interval without interference to/from the second radio technology component; and enabling the second radio technology component with the one or more control parameters to use radio resources on the UE during the second signaling interval without interference to/from the first radio technology component.

2. The method of claim 1 where the first radio technology component comprises an LTE component, and where the second radio technology component comprises a Global Positioning System (GPS) component or an Industrial, Science and Medical (ISM) component.

3. The method of claim 1 where one or more information elements appended to the RRC signaling message convey the one or more proposed control parameters.

4. The method of claim 1 where receiving the response message comprises receiving an RRC signaling message conveying the one or more control parameters comprising a Start Time Offset parameter specifying a start time for a coexistence mode, a Keeping Time parameter specifying an end time for the coexistence mode, and On-Interval parameter specifying a time duration for the first signaling interval, an Off-Interval parameter specifying a time duration for the second signaling interval, and a Possible Link parameter specifying a type of activity of the first radio technology component during the second signaling interval.

5. The method of claim 1 where receiving the response message comprises receiving an RRC signaling message with one or more information elements appended to the RRC signaling message to convey the one or more control parameters.

6. The method of claim 1 where receiving the response message comprises receiving an RRC signaling message to convey the one or more control parameters.

7. The method of claim 1 where receiving the update response message comprises receiving an RRC signaling message conveying a control parameter specifying a new end time for the coexistence mode.

8. The method of claim 1 where receiving the response message comprises receiving an RRC signaling message conveying the one or more control parameters comprising a Possible Link parameter comprising a first value if no uplink or downlink activity is expected for the first radio technology component during the second signaling interval, a second value if only downlink activity is expected for the first radio technology component during the second signaling interval, a third value if only uplink activity is expected for the first radio technology component during the second signaling interval, or fourth value if both uplink and downlink activity is expected for the first radio technology component during the second signaling interval.

9. The method of claim 1, where enabling the first radio technology component comprises enabling the first radio technology component to perform_hybrid automatic repeat request (HARQ) uplink/downlink operations during the first signaling interval and to stop any remaining HARQ uplink/downlink operations during the second signaling interval and wait for a subsequent available first signaling interval if a Possible Link control parameter indicates that no uplink or downlink activity is expected for the first radio technology component during the second signaling interval.

10. The method of claim 9, further comprising assuming an NACK is received from a radio access network (eNB) for HARQ UL transmission when no HARQ feedback is received during the first signaling interval.

11. The method of claim 9, further comprising assuming at a radio access network (eNB) that an ACK is received from user equipment (UE) for HARQ DL transmission when no HARQ feedback is received during the first signaling interval.

12. The method of claim 1, where enabling the first radio technology component comprises enabling the first radio technology component to perform HARQ uplink/downlink operations during the first signaling interval and to continue performing HARQ downlink operations during the second signaling interval but to stop any remaining HARQ uplink operations during the second signaling interval and wait for a subsequent available first signaling interval if a Possible Link control parameter indicates that downlink activity is expected for the first radio technology component during the second signaling interval.

13. The method of claim 1, where receiving the response message comprises receiving a response message comprising a Keeping Time parameter set to a first value to indicate that the coexistence request message is rejected.

14. The method of claim 1, further comprising enabling the first and second radio technology components to alternately use the radio resources during first and second signaling intervals, respectively, during a Keeping Time interval for the coexistence mode.

15. The method of claim 14, where the Keeping Time interval is established by receiving a response message comprising a Keeping Time parameter set to value to indicate how long the coexistence mode will be maintained.

16. The method of claim 14, where the Keeping Time interval is determined from network implementation.

17. The method of claim 14, where the Keeping Time interval is established by direct setup with media access control (MAC) control element (CE) and RRC signaling.

18. The method of claim 1, further comprising sending a second coexistence request message to convey alternative proposed control parameters for establishing a coexistence mode with first and second signaling intervals if the control parameters from the response message are not accepted by the user equipment (UE).

19. The method of claim 1, where receiving the response message comprising one or more control parameters comprises receiving an absolute value configuration for each of the one or more control parameters.

20. The method of claim 1, where receiving the response message comprising one or more control parameters comprises receiving a delta value configuration with only parameters that are different from the one or more proposed control parameters.

21. The method of claim 1, where enabling the second radio technology component comprises enabling the second radio technology component to use radio resources on the UE during the second signaling interval without interference from the first radio technology component if a Possible Link control parameter indicates that no uplink or downlink activity is expected for the first radio technology component during the second signaling interval and if there is no HARQ operation operating on the first radio technology component.

22. The method of claim 1, where enabling the second radio technology component comprises not enabling the second radio technology component to use radio resources on the UE during the second signaling interval until there is no HARQ operation operating on the first radio technology component if a Possible Link control parameter indicates that no uplink or downlink activity is expected for the first radio technology component during the second signaling interval.

23. A method for use in radio access network (eNB) to avoid interference between first and second radio technology components located on a single platform at a user equipment (UE), comprising:
receiving a coexistence request message conveying one or more proposed control parameters for establishing a coexistence mode with first and second signaling intervals for the first and second radio technology components, where the first and second signaling intervals are alternated during the coexistence mode, receiving the coexistence request message comprises receiving an RRC signaling message to convey the one or more proposed control parameters, and the one or more proposed control parameters comprise a Start Time Offset parameter specifying a start time for a coexistence mode, a Keeping Time parameter specifying an end time for the coexistence mode, and On-Interval parameter specifying a time duration for the first signaling interval, an Off-Interval parameter specifying a time duration for the second signaling interval, and a Possible Link parameter specifying a type of activity of the first radio technology component during the second signaling interval; and
sending a response message comprising one or more control parameters for establishing the first and second signaling intervals for the first and second radio technology components at the UE, where the first and second signaling intervals are alternated during the coexistence mode so that the first radio technology component at the UE can be enabled to use radio resources on the UE during the first signaling interval without interference to/from the second radio technology component, and so that the second radio technology component at the UE can be enabled to use radio resources on the UE during the second signaling interval without interference to/from the first radio technology component.

24. The method of claim 23 where one or more information elements appended to the RRC signaling message convey the one or more proposed control parameters.

25. The method of claim 23 where sending the response message comprises sending an RRC signaling message conveying the one or more control parameters comprising a Start Time Offset parameter specifying a start time for a coexistence mode, a Keeping Time parameter specifying an end time for the coexistence mode, and On-Interval parameter specifying a time duration for the first signaling interval, an Off-Interval parameter specifying a time duration for the second signaling interval, and a Possible Link parameter specifying a type of activity of the first radio technology component during the second signaling interval.

26. The method of claim 23 where sending the response message comprises sending an RRC signaling message with one or more information elements appended to the RRC signaling message to convey the one or more control parameters.

27. The method of claim 23 where sending the response message comprises sending a RRC signaling message to convey the one or more control parameters.

28. The method of claim 23 where sending the update response message comprises sending an RRC signaling message conveying a control parameter specifying an earlier or later end time for the coexistence mode.

29. The method of claim 23 where sending the response message comprises sending an RRC signaling message conveying the one or more control parameters comprising a Possible Link parameter comprising a first value if no uplink or downlink activity is expected for the first radio technology component during the second signaling interval, a second value if only downlink activity is expected for the first radio technology component during the second signaling interval, a third value if only uplink activity is expected for the first radio technology component during the second signaling interval, or fourth value if both uplink and downlink activity is expected for the first radio technology component during the second signaling interval.

30. The method of claim 23, further comprising sending the user equipment (UE) downlink information for the first radio technology component during the second signaling interval if a Possible Link control parameter indicates that downlink activity is expected for the first radio technology component during the second signaling interval.

31. The method of claim 23, further comprising receiving from the user equipment (UE) uplink information from the first radio technology component during the second signaling interval if a Possible Link control parameter indicates that uplink activity is expected for the first radio technology component during the second signaling interval.

32. The method of claim 23, further comprising sending the user equipment (UE) downlink information for the first radio technology component during the second signaling interval and receiving from the user equipment (UE) uplink information from the first radio technology component during the second signaling interval if a Possible Link control parameter indicates that both uplink and downlink activity is expected for the first radio technology component during the second signaling interval.

33. The method of claim 23, where sending the response message comprises sending a response message comprising a Keeping Time parameter set to a first value to indicate that the coexistence request message is rejected.

34. A computer program product comprising a non-transitory computer readable storage medium having computer readable program code embodied therein, said computer readable program code adapted to be executed to implement a method for operating user equipment (UE) in a coexistence mode, comprising:
instructions for sending an RRC signaling request message to convey one or more proposed control parameters for establishing a coexistence mode with first and second signaling intervals for the first and second radio technology components, where the first and second signaling intervals are alternated during the coexistence mode, where sending the coexistence request message comprises sending an RRC signaling message to convey the one or more proposed control parameters, and the one or more proposed control parameters comprise a Start Time Offset parameter specifying a start time for a coexistence mode, a Keeping Time parameter specifying an end time for the coexistence mode, and On-Interval parameter specifying a time duration for the first signaling interval, an Off-Interval parameter specifying a time duration for the second signaling interval, and a Possible Link parameter specifying a type of activity of the first radio technology component during the second signaling interval;
instructions for receiving an RRC signaling response message comprising one or more control parameters for establishing the first and second signaling intervals for the first and second radio technology components, where the first and second signaling intervals are alternated during the coexistence mode, the one or more control parameters comprising a Start Time Offset parameter specifying a start time for a coexistence mode, a Keeping Time parameter specifying an end time for the coexistence mode, and On-Interval parameter specifying a time duration for the first signaling interval, an Off-Interval parameter specifying a time duration for the second signaling interval, and a Possible Link parameter specifying a type of activity of the first radio technology component during the second signaling interval;

instructions for enabling the first radio technology component with the one or more control parameters to use radio resources on the UE during the first signaling interval without interference to/from the second radio technology component; and instructions for enabling the second radio technology component with the one or more control parameters to use radio resources on the UE during the second signaling interval without interference to/from the first radio technology component.

35. A User Equipment (UE), comprising:
one or more processors configured to:
send a coexistence request message to convey one or more proposed control parameters for establishing a coexistence mode with first and second signaling intervals for the first and second radio technology components, where sending the coexistence request message comprises sending an RRC signaling message to convey the one or more proposed control parameters, and the one or more proposed control parameters comprise a Start Time Offset parameter specifying a start time for a coexistence mode, a Keeping Time parameter specifying an end time for the coexistence mode, and On-Interval parameter specifying a time duration for the first signaling interval, an Off-Interval parameter specifying a time duration for the second signaling interval, and a Possible Link parameter specifying a type of activity of the first radio technology component during the second signaling interval;

receive a response message comprising one or more control parameters for establishing the first and second signaling intervals for the first and second radio technology components, where the first and second signaling intervals are alternated during the coexistence mode;

enable the first radio technology component with the one or more control parameters to use radio resources on the UE during the first signaling interval without interference to/from the second radio technology component; and enable the second radio technology component with the one or more control parameters to use radio resources on the UE during the second signaling interval without interference to/from the first radio technology component.

36. The UE of claim 35, where the first radio technology component comprises an LTE component, and where the second radio technology component comprises a Global Positioning System (GPS) component or an Industrial, Science and Medical (ISM) component.

37. The UE of claim 25, where one or more information elements appended to the RRC signaling message convey the one or more control parameters.

38. An Evolved Node B (eNB), comprising:
one or more processors configured to:
receive a coexistence request message conveying one or more proposed control parameters for establishing a coexistence mode with first and second signaling intervals for the first and second radio technology components, where the first and second signaling intervals are alternated during the coexistence mode, receiving the coexistence request message comprises receiving an RRC signaling message to convey the one or more proposed control parameters, and the one or more proposed control parameters comprise a Start Time Offset parameter specifying a start time for a coexistence mode, a Keeping Time parameter specifying an end time for the coexistence mode, and On-Interval parameter specifying a time duration for the first signaling interval, an Off-Interval parameter specifying a time duration for the second signaling interval, and a Possible Link parameter specifying a type of activity of the first radio technology component during the second signaling interval; and send a response message comprising one or more control parameters for establishing the first and second signaling intervals for the first and second radio technology components at the UE, where the first and second signaling intervals are alternated during the coexistence mode so that the first radio technology component at the UE can be enabled to use radio resources on the UE during the first signaling interval without interference to/from the second radio technology component, and so that the second radio technology component at the UE can be enabled to use radio resources on the UE during the second signaling interval without interference to/from the first radio technology component.

39. The eNB of claim 38, where the first radio technology component comprises an LTE component, and where the second radio technology component comprises a Global Positioning System (GPS) component or an Industrial, Science and Medical (ISM) component.

40. The eNB of claim 38, where sending the coexistence request message comprises sending an RRC signaling message to convey the one or more proposed control parameters.

41. The eNB of claim 38, where one or more information elements appended to the RRC signaling message convey the one or more control parameters.

42. The eNB of claim 38, where sending the update message comprises sending an RRC signaling message to convey the one or more proposed control parameters for early terminating or extending the coexistence mode.

43. The eNB of claim 42, where receiving the update response message comprises receiving an RRC signaling message to convey the one or more control parameters for early terminating or extending the coexistence mode.

* * * * *